(12) United States Patent
Baldemair et al.

(10) Patent No.: US 11,329,770 B2
(45) Date of Patent: May 10, 2022

(54) SYSTEMS AND METHODS OF SELECTING A CELL FOR TRANSMITTING CONTROL INFORMATION

(71) Applicant: Telefonaktiebolaget LM Ericsson (publ), Stockholm (SE)

(72) Inventors: Robert Baldemair, Solna (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/962,415

(22) PCT Filed: Jan. 22, 2019

(86) PCT No.: PCT/EP2019/051498
§ 371 (c)(1),
(2) Date: Jul. 15, 2020

(87) PCT Pub. No.: WO2019/141870
PCT Pub. Date: Jul. 25, 2019

(65) Prior Publication Data
US 2021/0075560 A1 Mar. 11, 2021

Related U.S. Application Data

(60) Provisional application No. 62/620,288, filed on Jan. 22, 2018.

(51) Int. Cl.
*H04L 1/18* (2006.01)
(52) U.S. Cl.
CPC .................................. *H04L 1/1854* (2013.01)

(58) Field of Classification Search
CPC ... H04L 1/1854; H04L 1/0073; H04L 1/1861; H04L 1/1893; H04L 5/0055; H04W 52/0216; H04W 72/02; H04W 72/0413; Y02D 30/70
See application file for complete search history.

(56) References Cited

U.S. PATENT DOCUMENTS

2018/0006791 A1* 1/2018 Marinier ............... H04L 5/0055
2020/0036480 A1* 1/2020 Yang .................... H04L 1/1829

FOREIGN PATENT DOCUMENTS

| EP | 2606595 A2 | 6/2013 |
|----|------------|--------|
| EP | 3094030 A1 | 11/2016 |
| EP | 3190840 A1 | 7/2017 |
| WO | 2012024220 A2 | 2/2012 |
| WO | 2014047860 A1 | 4/2014 |
| WO | 2016162090 A1 | 10/2016 |

* cited by examiner

*Primary Examiner* — Mansour Oveissi
(74) *Attorney, Agent, or Firm* — Coats & Bennett, PLLC

(57) ABSTRACT

A wireless device receives, from a network node, an uplink grant for each of one or more cells, where at least one of the received uplink grants indicates a first number of downlink assignments by the network node to the wireless device. The wireless device selects, as a first cell, one of the one or more cells responsive to the at least one received uplink grant indicating the first number of downlink assignments. The wireless device then transmits Uplink Control Information (UCI) via the first cell. The UCI comprises a first number of ACK/NACK bits defined by the first number of downlink assignments.

20 Claims, 27 Drawing Sheets

SYSTEMS AND METHODS OF SELECTING A CELL FOR TRANSMITTING CONTROL INFORMATION

This application claims priority to Provisional U.S. Patent Application 62/620,288 filed 22 Jan. 2018, the disclosure of which is incorporated herein by reference in its entirety.

TECHNICAL FIELD

The solution presented herein relates generally to transmitting Uplink Control Information (UCI) from a wireless device to a network node, and more particularly to transmitting UCI containing a defined number of acknowledgement/negative acknowledgement (ACK/NACK) bits via a selected cell.

BACKGROUND

Both New Radio (NR) and Long Term Evolution (LTE) support UpLink (UL) carrier aggregation and Uplink Control Information (UCI), e.g., acknowledgement/negative acknowledgement (ACK/NACK), Channel State Information (CSI), Scheduling Requests (SRs), beam information, etc.). The UCI is not transmitted on the Physical Uplink Control Channel (PUCCH), but rather on the Physical Uplink Shared Channel (PUSCH) when the wireless device transmitting the UCI has a valid UL grant. However, when the wireless device has multiple UL Component Carriers (CCs) configured and valid UL grants for multiple ones of the UL cells, the wireless device has to determine which UL cell to use for transmitting the UCI. Some conventional solutions do not provide sufficient flexibility and/or are prone to errors resulting in corrupted data transmissions. Thus, there remains a need for improved UCI transmission solutions.

SUMMARY

The solution presented herein uses UL grants transmitted by the network node to indicate to the wireless device how many downlink assignments the network node makes for the wireless device, and thus indicates how many ACK/NACK bits should be included in the UCI transmitted by the wireless device to the network node, and to help the wireless device determine which cell should be used for the transmission of the UCI. In so doing, the solution presented herein reduces errors and provides more flexibility to the wireless network.

One exemplary embodiment comprises a method, performed by a wireless device, of transmitting uplink control information. The method comprises receiving, from a network node, an uplink grant for each of one or more cells, wherein at least one of the received uplink grants indicates a first number of downlink assignments by the network node to the wireless device. The method further comprises selecting, as a first cell, one of the one or more cells responsive to the at least one received uplink grant indicating the first number of downlink assignments. The method further comprises transmitting uplink control information via the first cell. The uplink control information comprises a first number of acknowledgement/negative acknowledgement (ACK/NACK) bits defined by the first number of downlink assignments.

Another exemplary embodiment comprises a wireless device comprising processing circuitry and power supply circuitry. The processing circuitry is configured to receive, from a network node, an uplink grant for each of one or more cells, wherein at least one of the received uplink grants indicates a first number of downlink assignments by the network node to the wireless device. The processing circuitry is further configured to select, as a first cell, one of the one or more cells responsive to the at least one received uplink grant indicating the first number of downlink assignments. The processing circuitry is further configured to transmit uplink control information via the first cell. The uplink control information comprises a first number of acknowledgement/negative acknowledgement (ACK/NACK) bits defined by the first number of downlink assignments. The power supply circuitry is configured to supply power to the wireless device. In some exemplary embodiments, the wireless device comprises a user equipment.

Another exemplary embodiment comprises a wireless device comprising a receiving unit/circuit/module, a cell selecting unit/circuit/module, and a transmitting unit/circuit/module. The receiving unit/circuit/module is configured to receive, from a network node, an uplink grant for each of one or more cells, wherein at least one of the received uplink grants indicates a first number of downlink assignments by the network node to the wireless device. The cell selecting unit/circuit/module is configured to select, as a first cell, one of the one or more cells responsive to the at least one received uplink grant indicating the first number of downlink assignments. The transmitting unit/circuit/module is configured to transmit uplink control information via the first cell. The uplink control information comprises a first number of acknowledgement/negative acknowledgement (ACK/NACK) bits defined by the first number of downlink assignments. In some exemplary embodiments, the wireless device comprises a user equipment.

Another exemplary embodiment comprises a computer program product for controlling a wireless device. The computer program product comprises software instructions which, when run on at least one processing circuit in the wireless device, causes the wireless device to receive, from a network node, an uplink grant for each of one or more cells, wherein at least one of the received uplink grants indicates a first number of downlink assignments by the network node to the wireless device. The software instructions further cause the wireless device to select, as a first cell, one of the one or more cells responsive to the at least one received uplink grant indicating the first number of downlink assignments. The software instructions further cause the wireless device to transmit uplink control information via the first cell. The uplink control information comprises a first number of acknowledgement/negative acknowledgement (ACK/NACK) bits defined by the first number of downlink assignments. In some embodiments, a computer-readable medium comprises the computer program product. In some embodiments, the computer-readable medium comprises a non-transitory computer-readable medium.

Another exemplary embodiment comprises a method, performed by a network node in communication with a wireless device, of obtaining uplink control information. The method comprises generating an uplink grant for each of one or more cells, wherein at least one of the generated uplink grants indicates a first number of downlink assignments by the network node to the wireless device to indicate to the wireless device a first number of acknowledgement/negative acknowledgement (ACK/NACK) bits to be transmitted to the network node. The method further comprises transmitting each of the generated uplink grants to the wireless device. The method further comprises receiving uplink control information via a first cell selected by the wireless device responsive to the transmitted uplink grants. The first cell comprises one of the cells selected by the wireless device responsive to the at least one generated uplink grants indicating the first number of downlink assignments, said uplink control information comprising the first number of ACK/NACK bits.

Another exemplary embodiment comprises a network node comprising processing circuitry and power supply circuitry. The processing circuitry is configured to generate an uplink grant for each of one or more cells, wherein at least one of the generated uplink grants indicates a first number of downlink assignments by the network node to the wireless device to indicate to the wireless device a first number of acknowledgement/negative acknowledgement (ACK/NACK) bits to be transmitted to the network node. The processing circuitry is further configured to transmit each of the generated uplink grants to the wireless device. The processing circuitry is further configured to receive uplink control information via a first cell selected by the wireless device responsive to the transmitted uplink grants. The first cell comprises one of the cells selected by the wireless device responsive to the at least one generated uplink grants indicating the first number of downlink assignments, said uplink control information comprising the first number of ACK/NACK bits. The power supply circuitry configured to supply power to the network node.

Another exemplary embodiment comprises a network node comprising a grant generating unit/circuit/module, a transmitting unit/circuit/module, and a receiving unit/circuit/module. The grant generating unit/circuit/module is configured to generate an uplink grant for each of one or more cells, wherein at least one of the generated uplink grants indicates a first number of downlink assignments by the network node to the wireless device to indicate to the wireless device a first number of acknowledgement/negative acknowledgement (ACK/NACK) bits to be transmitted to the network node. The transmitting unit/circuit/module is configured to transmit each of the generated uplink grants to the wireless device. The receiving unit/circuit/module is configured to receive uplink control information via a first cell selected by the wireless device responsive to the transmitted uplink grants. The first cell comprises one of the cells selected by the wireless device responsive to the at least one generated uplink grants indicating the first number of downlink assignments, said uplink control information comprising the first number of ACK/NACK bits.

Another exemplary embodiment comprises a computer program product for controlling a network node. The computer program product comprises software instructions which, when run on at least one processing circuit in the network node, causes the network node to generate an uplink grant for each of one or more cells, wherein at least one of the generated uplink grants indicates a first number of downlink assignments by the network node to the wireless device to indicate to the wireless device a first number of acknowledgement/negative acknowledgement (ACK/NACK) bits to be transmitted to the network node. The software instructions further cause the network node to transmit each of the generated uplink grants to the wireless device. The software instructions further cause the network node to receive uplink control information via a first cell selected by the wireless device responsive to the transmitted uplink grants. The first cell comprises one of the cells selected by the wireless device responsive to the at least one generated uplink grants indicating the first number of downlink assignments, said uplink control information comprising the first number of ACK/NACK bits. In some exemplary embodiments, a computer-readable medium comprises the computer program product. In some exemplary embodiments, the computer-readable medium comprises a non-transitory computer-readable medium.

DETAILED DESCRIPTION

Figure 1A:
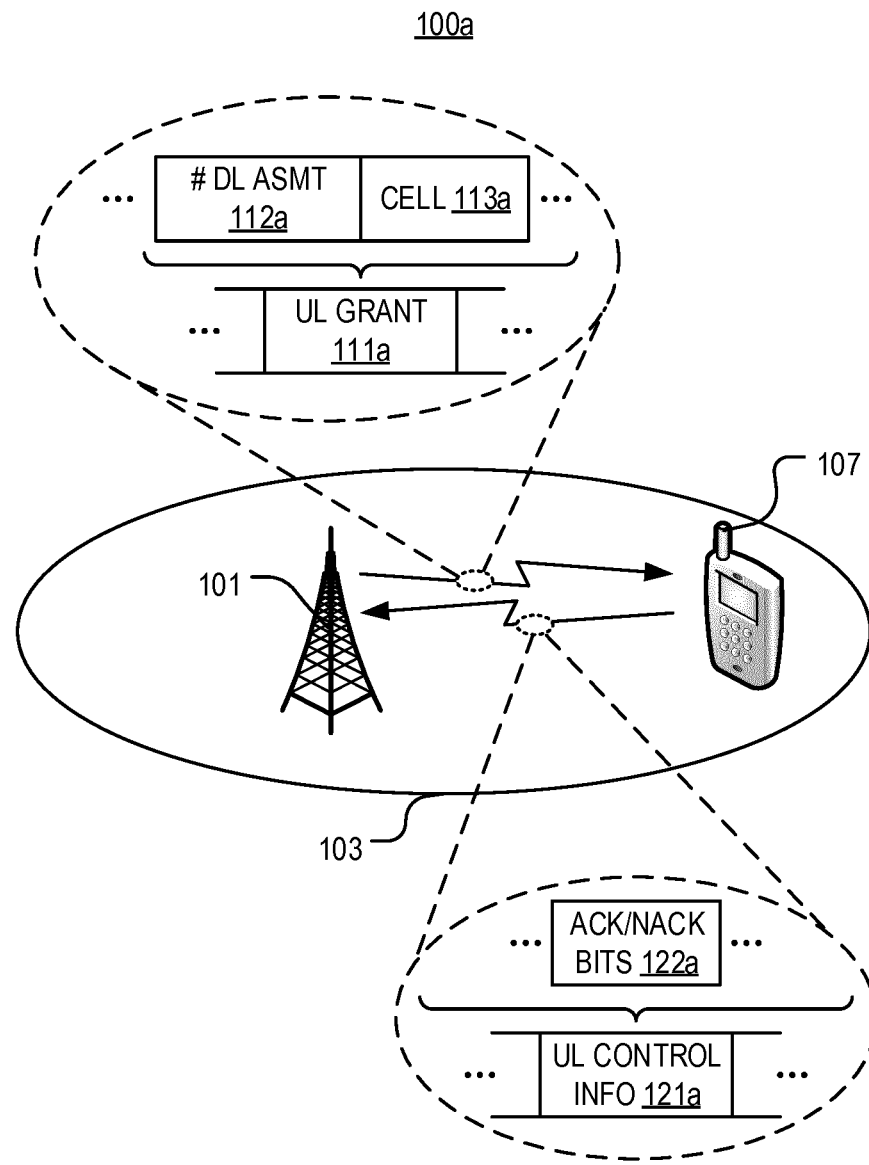
FIGS. 1A and 1B show exemplary wireless communication systems.

The following describes the problem and the solution in terms of a wireless communications between a network node and a wireless device. The wireless device receives DownLink (DL) communications from the network node and transmits UpLink (UL) communications to the network node. The network node receives UL communications from the wireless device and transmits DL communications to the wireless device. As discussed further below, the term wireless device may be used interchangeably herein with User Equipment (UE).

In LTE, UL UCI transmissions may operate according to the following rule: If the UE does not receive an UL grant having the aperiodic Channel State Information (CSI) request field set, the UE transmits the UCI via a primary cell (PCell) when the UE has a valid UL grant for the PCell. If the UE does not have a valid grant for the PCell, the UE transmits the UCI on one of the Secondary Cells (SCells), e.g., the SCell with lowest configured SCell index and for which UE has a valid UL grant. When the UE is configured with multiple PUCCH groups, the PCell/SCell option described above is applied within a PUCCH group, where the primary PUCCH group contains the PCell and one or multiple SCells, and a secondary PUCCH contains a Primary Secondary Cell (PSCell) and one or multiple SCells (and in above behavior, the PCell is replaced by PSCell for a secondary PUCCH group). If the aperiodic CSI request field is set in one UL grant, the wireless device transmits the UCI via the UL cell for which the grant is valid for the UE.

An UL grant in NR (at least the non-fallback Downlink Control Information (DCI)) contains an UL Downlink Assignment Indicator (UL DAI), which indicates all of the scheduled downlink data. The UL DAI therefore indicates the number of DL transmission assignments to the UE, and thus indicates the number of ACK/NACK bits (defined by the number of DL transmission assignments) the UE should include in the transmitted UCI. In some embodiments, the UL DAI is a 2 bit field that is mapped to four values: 1, 2, 3, and 4. In this exemplary embodiment, the UL DAI cannot express value 0, and thus cannot directly indicate that the number of ACK/NACK bits included in the UCI should be zero. If the network node wants to indicate to the UE it should not include any ACK/NACK bits in the UCI, the network node may, for example, set the UL DAI to pre-agreed upon value, e.g., 4. In this example, the UE will have to determine whether the pre-agreed upon value means the UE should include 4 ACK/NACK bits in the UCI or whether the UE should include zero ACK/NACK bits in the UCI. It is rather unlikely that the UE will miss all DL assignments. Thus, if a UE received at least one DL assignment, the UE knows a DAI a value of 4 means the UE knows the received cannot mean 0, but rather means 4 (or 4+n*4 due to mod arithmetic). If a UE received more than one DL assignment with a DAI of 4, the UE may interpret the multiple DAIs with a value of 4 as really meaning 0, e.g., no ACK/NACK bits should be included in the UCI. A misinterpretation may occur if the UE is scheduled four times in the DL, and UE misses all four DL assignments. As noted above, however, this is rather unlikely.

As noted above, in LTE the UE transmits the UCI on the PCell if the UE has a valid UL grant for the PCell, and transmits on the SCell with the lowest configured SCell index for which the UE has a valid UL grant and when the UE does not have a valid UL grant for the PCell. The LTE solution, however, provides limited flexibility on which UL cell to transmit the UCI. For example, as soon as the PCell (or PSCell) is scheduled, the UE transmits the UCI on PCell (or PSCell), or in absence of an UL grant for a PCell (or PSCell), the UE transmits the UCI on the SCell with the lowest SCell index within the PUCCH group.

In addition the following error case may occur. If the UE has a valid UL grant for the PCell and at least one more UL cell, but misses the UL grant for the PCell, the UE will transmit the UCI via the SCell with lowest SCell index, but the network node expects the UCI to be transmitted via the PCell. The consequence of this error is corrupted data transmissions on the lowest-numbered SCell and no data transmissions on the PCell (missed grant), as well as a failure by the network node to receive the UCI.

Certain aspects of the present disclosure and their embodiments may provide solutions to these or other challenges.

According to embodiments of the solution presented herein, the UE transmits the UCI via the cell for which the UL grant indicates an UL DAI greater than or equal to 1. If an UL grant for another UL cell has the aperiodic CSI request field set, UE may:

1) also send aperiodic CSI via the cell which UL grant has an UL DAI greater than or equal to 1; or
2) transmit UCI via the cell indicated by the UL grant with the aperiodic CSI request field set; or
3) send the ACK/NACK bits via the cell indicated by the UL grant with an UL DAI greater than or equal to 1 and the CSI via the cell which UL grant has the aperiodic CSI request field set.

The above exemplary solutions assume that the UE has ACK/NACK bits to report; if the UE does not have any ACK/NACK bits to report (i.e., the UL grants for multiple cells have a DAI indicating 4,which the UE translates as 0), an alternative solution, e.g. the LTE solution, may be used.

According to embodiments presented herein, the UE uses the cell for which the UL grant indicates an UL DAI greater than or equal to 1 for transmitting the UCI on the PUSCH.

Certain embodiments may provide one or more of the following technical advantage(s). For example, certain embodiments may provide more flexibility to select the UL cell that should be used to transmit the UCI. Further, certain embodiments avoid the error case outlined above.

Figure 1B:
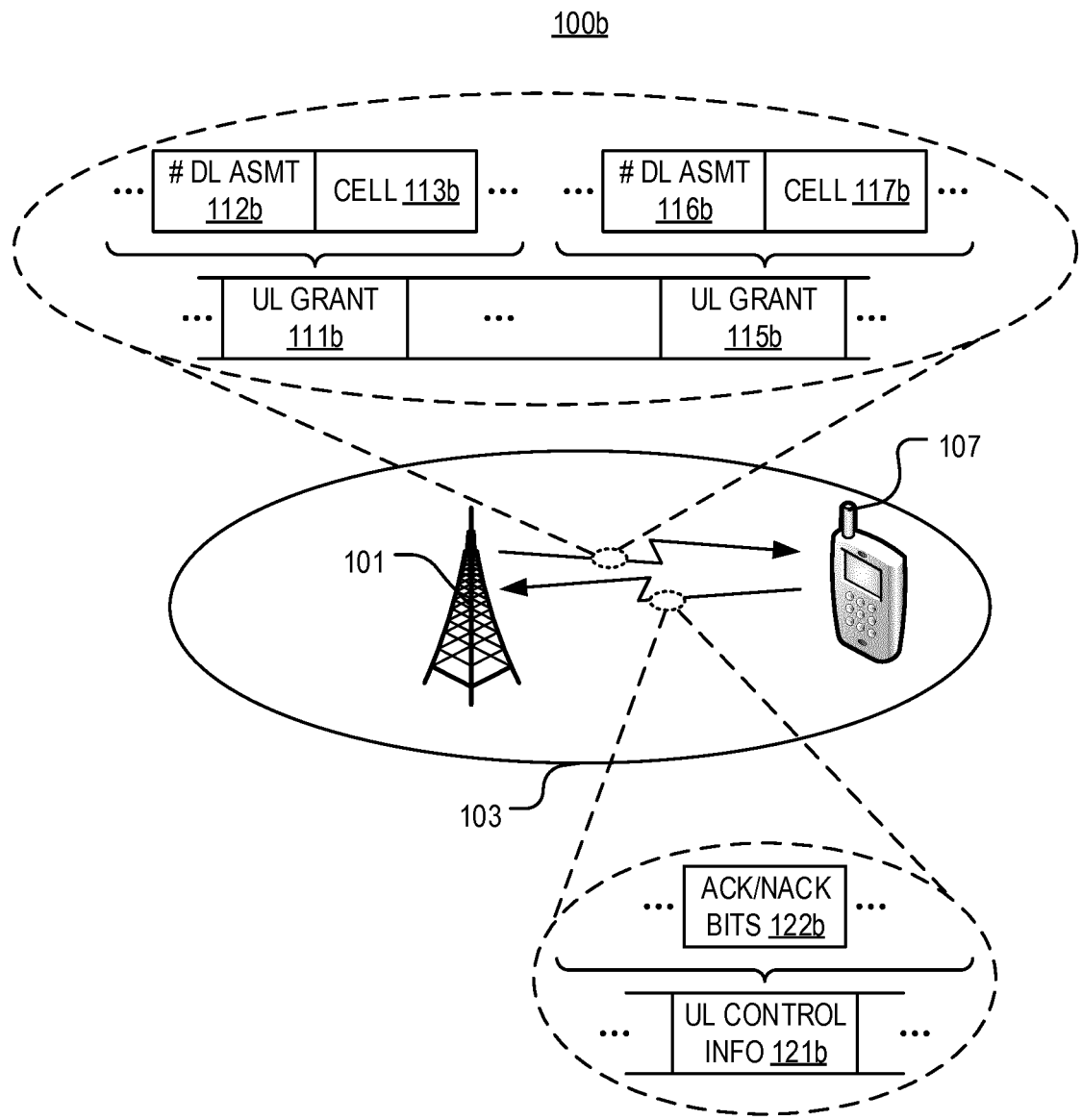

In view of the embodiments above, the solution presented herein generally includes the following embodiments, e.g., which may address one or more of the issues disclosed herein. In one embodiment, FIGS. 1A and 1B illustrate embodiments of systems 100a,b for selecting a cell for transmitting control information from a wireless device 107 to a network node 101 in accordance with various aspects as described herein. The systems 100a,b may include the network node 101 (e.g., base station, gNB) and the wireless device 107 (e.g., UE). In one embodiment, the network node 101 may be associated with one or more cells, e.g., cell 103. In one example, a cell is one or more carriers associated with a sector of a base station. In another example, a cell is one or more carriers associated with one of a plurality of transmission/reception points in a sector of a base station. In yet another example, a cell is one or more carriers on which a same cell-specific reference signal is transmitted. In still yet another example, a cell is one or more carriers on which a same cell identifier (e.g., physical layer cell ID) is transmitted. In FIG. 1A, in one embodiment, the network node 101 transmits, to the wireless device 107, an uplink grant 111a that indicates a number of downlink assignments, and thus indicates a number of acknowledgement or negative acknowledgement bits 112a, defined by the number of assigned downlink assignments, that the wireless device 107 is to include on an uplink channel (e.g., PUSCH) associated with the uplink grant 111a. The wireless device 107 then receives that uplink grant 111a, and then may determine whether the number of acknowledgment or negative acknowledgement bits 112a is at least one. In response to determining that the number of acknowledgement or negative acknowledgement bits 112a is at least one bit, the wireless device 107 transmits, on the uplink channel, to a cell 113a indicated by that uplink grant 111a, uplink control information 121a having the indicated number of acknowledgement or negative acknowledgement bits 122a. When the number of acknowledgement or negative acknowledgement bits to be included is zero, the wireless device 107 transmits the uplink control information without any acknowledgement or negative acknowledgement bits. The network node 101 then receives the uplink control information 121a including the number of acknowledgement or negative acknowledgement bits 122a on that uplink channel on the cell 113a indicated by the uplink grant 111a.

In FIG. 1B, in one embodiment, the network node 101 transmits, to the wireless device 107, a plurality of uplink grants 111*b*, 115*b*. The uplink grant 111*b* indicates that the number of acknowledgement or negative acknowledgement bits 112*b* is at least one bit, associated with a downlink channel, that the wireless device 107 is to include on an uplink channel associated with the uplink grant 111*b*. Further, the uplink grant 115*b* indicates that the number of acknowledgement or negative acknowledgement bits 116*b* indicates an invalid number of bits or that the associated uplink control information does not include the acknowledgement or negative acknowledgement bits. The wireless device 107 then receives those uplink grants 111*b*, 115*b* and then may select, from cells 113*b*, 117*b* indicated by the respective uplink grants 111*b*, 115*b*, the cell 113*b* indicated by the uplink grant 111*b* that indicates that the number of acknowledgement or negative acknowledgement bits 113*b* is at least one bit, to transmit the uplink control information 121*b*. The wireless device 107 then transmits, on the uplink channel, to the selected cell 113*b*, uplink control information 121*b* having the acknowledgement or negative acknowledgement bits 122*b*. The network node 101 then receives the uplink control information 121*b* having the acknowledgement or negative acknowledgement bits 122*b* on that uplink channel on the cell 113*b* indicated by the uplink grant 111*b*.

In FIG. 1B, in another embodiment, the network node 101 transmits, to the wireless device 107, a plurality of uplink grants, including at least two uplink grants 111*b*, 115*b* that respectively indicate that the number of acknowledgement or negative acknowledgement bits 112*b*, 116*b* is at least one bit. The wireless device 107 then receives those uplink grants and then may select, from among cells 113*b*, 117*b* indicated by those at least two uplink grants 111*b*, 115*b*, a cell that has a lowest or highest cell index or a cell that has a smallest or largest resource allocation for the uplink channel, to transmit the uplink control information 121*b* having the acknowledgement or negative acknowledgement bits 122*b*. The wireless device 107 then transmits, on the uplink channel, on the selected cell, uplink control information 121*b* having the acknowledgement or negative acknowledgement bits 122*b*. The network node 101 then receives the uplink control information 121*b* having the acknowledgement or negative acknowledgement bits 122*b* on that uplink channel on the selected cell.

In FIGS. 1A and 1B, the network node 101 may be configured to support one or more communication systems such as LTE, UMTS, GSM, NB-IoT, 5G New Radio (NR), the like, or any combination thereof. Further, the network node 101 may be a base station, an access point, or the like. Also, the network node 101 may serve wireless device 107. The wireless device 107 may be configured to support one or more communication systems such as LTE, UMTS, GSM, NB-IoT, 5G NR, the like, or any combination thereof.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 2:
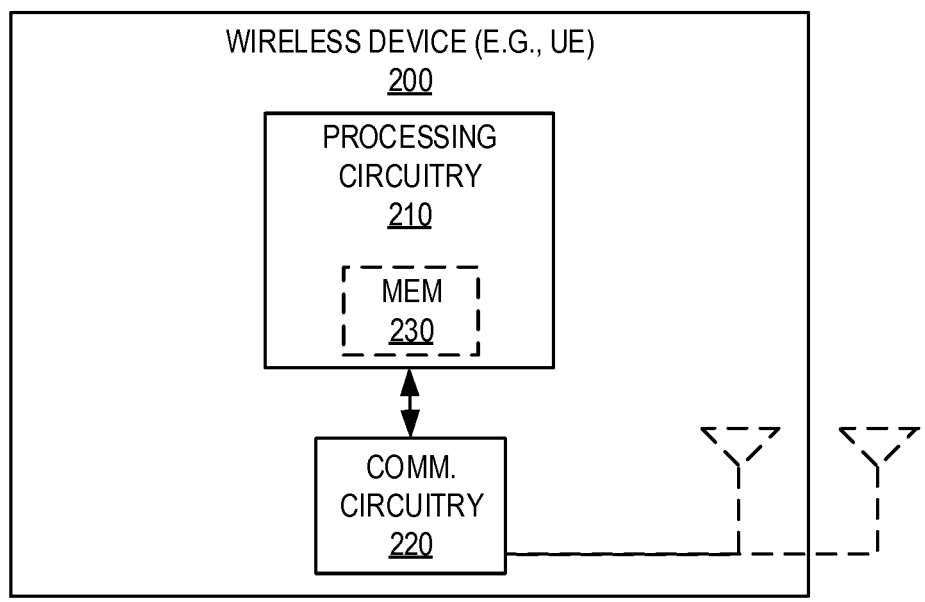
FIG. 2 shows a block diagram of a wireless device according to one exemplary embodiment.

For example, FIG. 2 illustrates one embodiment of a wireless device 200 in accordance with various embodiments described herein. As shown, the wireless device 200 includes processing circuitry 210 and communication circuitry 220. The communication circuitry 220 (e.g., radio circuitry) is configured to transmit and/or receive information to and/or from one or more other nodes, e.g., via any communication technology. Such communication may occur via one or more antennas that are either internal or external to the wireless device 200. The processing circuitry 210 is configured to perform processing described above, such as by executing instructions stored in memory 230. The processing circuitry 210 in this regard may implement certain functional means, units, or modules.

Figure 3:
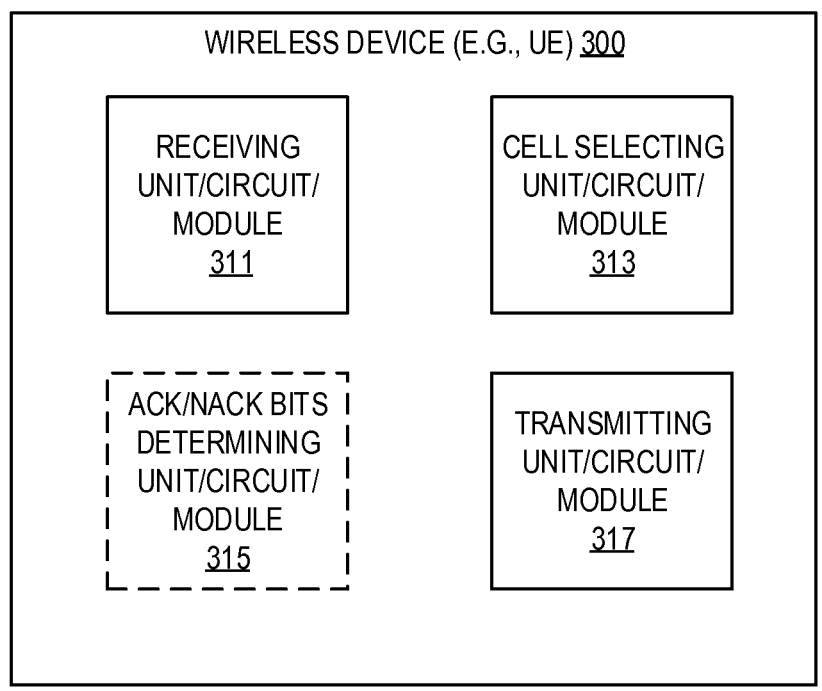
FIG. 3 shows a block diagram of a wireless device according to another exemplary embodiment.
Figure 8:
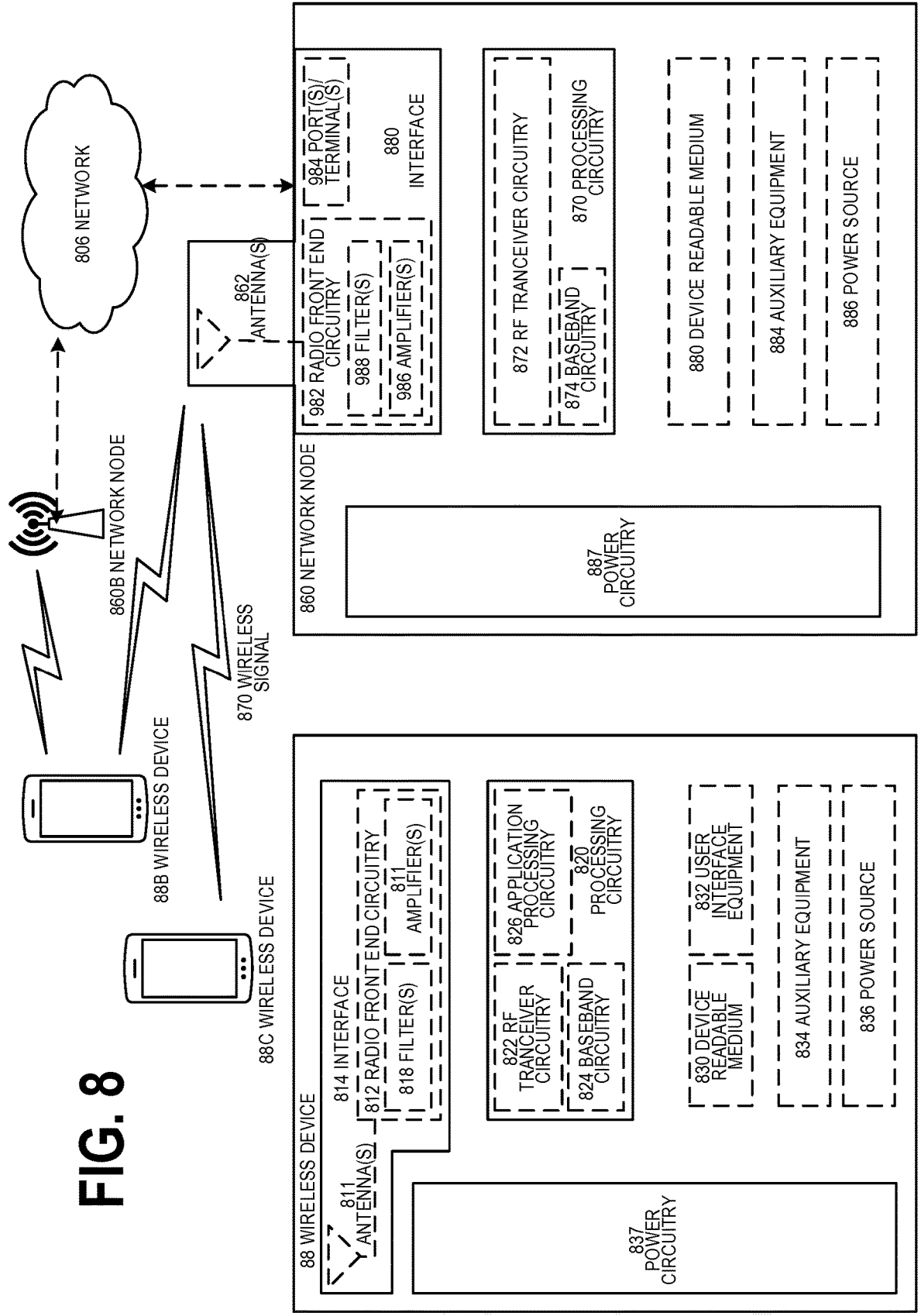
FIG. 8 shows an exemplary wireless network applicable to the solution presented herein.

FIG. 3 illustrates a schematic block diagram of one embodiment of a wireless device 300 in a wireless network in accordance various embodiments described herein (for example, the wireless network shown in FIGS. 1A and 1B, and 8). As shown, the wireless device 300 implements various functional means, units, circuits, or modules, e.g., via the processing circuitry 210 in FIG. 2 and/or via software code. In one embodiment, these functional means, units, circuits, or modules, e.g., for implementing the method(s) herein, may include for instance: a receiving unit/circuit/module 311 configured to receive, from a network node, an uplink grant for each of one or more cells, where at least one of the received uplink grants indicates a first number of downlink assignments by the network node to the wireless device; a cell selecting unit/circuit/module 313 configured to select, as a first cell, one of the one or more cells responsive to the at least one received uplink grants indicating the first number of downlink assignments; and a transmitting unit/circuit/module 317 configured to transmit uplink control information via the first cell, where the uplink control information comprises a first number of ACK/NACK bits defined by the first number of downlink assignments. Wireless device 300 may also include an explicit ACK/NAK bits determining unit/circuit/module 315 for determining the number of ACK/NACK bits from the received uplink grant(s).

FIGS. 4A-4I illustrate embodiments of methods 400*a-i* performed by a wireless device for selecting a cell for transmitting uplink control information in accordance with various embodiments described herein. It will be appreciated that because the number of downlink assignments indicates the number of ACK/NACK bits for the wireless device to transmit, the embodiments described herein interchangeably describe the solution in terms of UL grant(s) that indicate the number of downlink assignments and in terms of UL grant(s) that indicate the number ACK/NACK bits the wireless device should transmit to the network node.

Figure 4A:
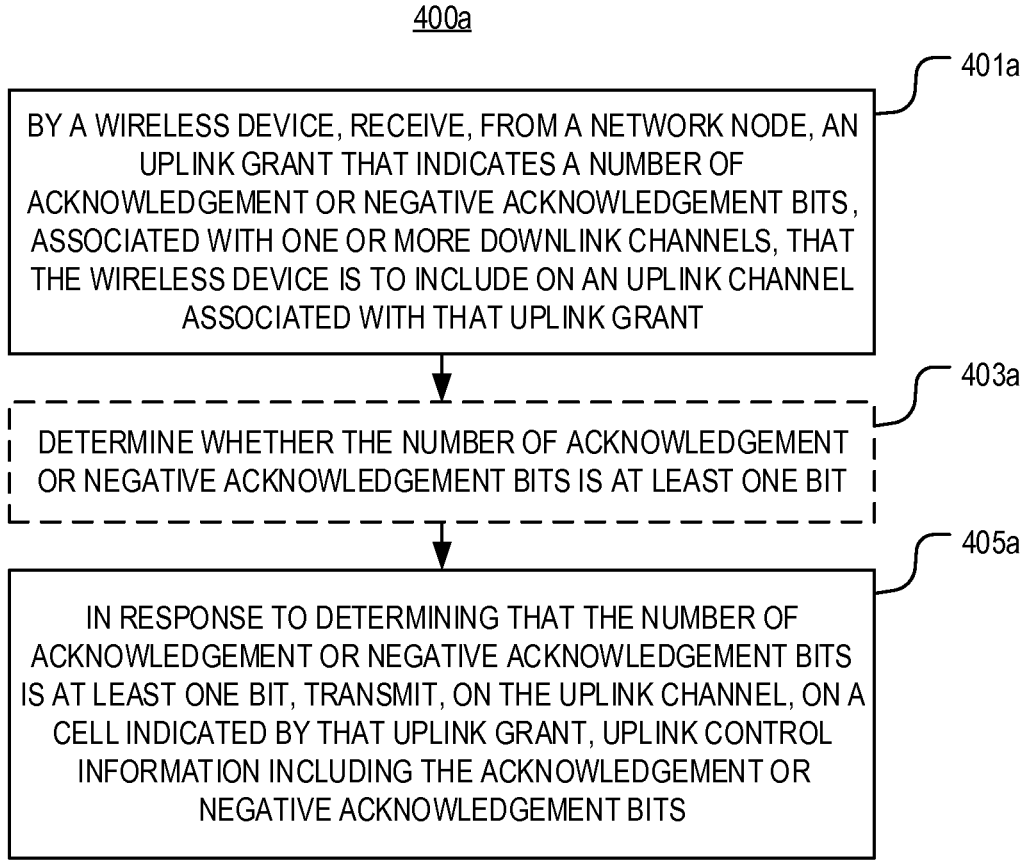
FIGS. 4A-4J show exemplary methods performed by a wireless device according to exemplary embodiments.

In FIG. 4A, the method 400*a* may start, for example, at block 401*a* where it includes receiving, from a network node, an uplink grant that indicates a number of acknowledgement or negative acknowledgement bits, associated with one or more downlink assignments, that the wireless device is to include on an uplink channel associated with that uplink grant. At block 403*a*, the method 400*a* may include determining whether the number of acknowledgement or negative acknowledgement bits is at least one bit. In response to determining that the number of acknowledgement or negative acknowledgement bits is at least one bit, the method 400a transmits, on the uplink channel, to a cell indicated by that uplink grant, uplink control information having the acknowledgement or negative acknowledgement bits, as represented by block 405a.

Figure 4B:
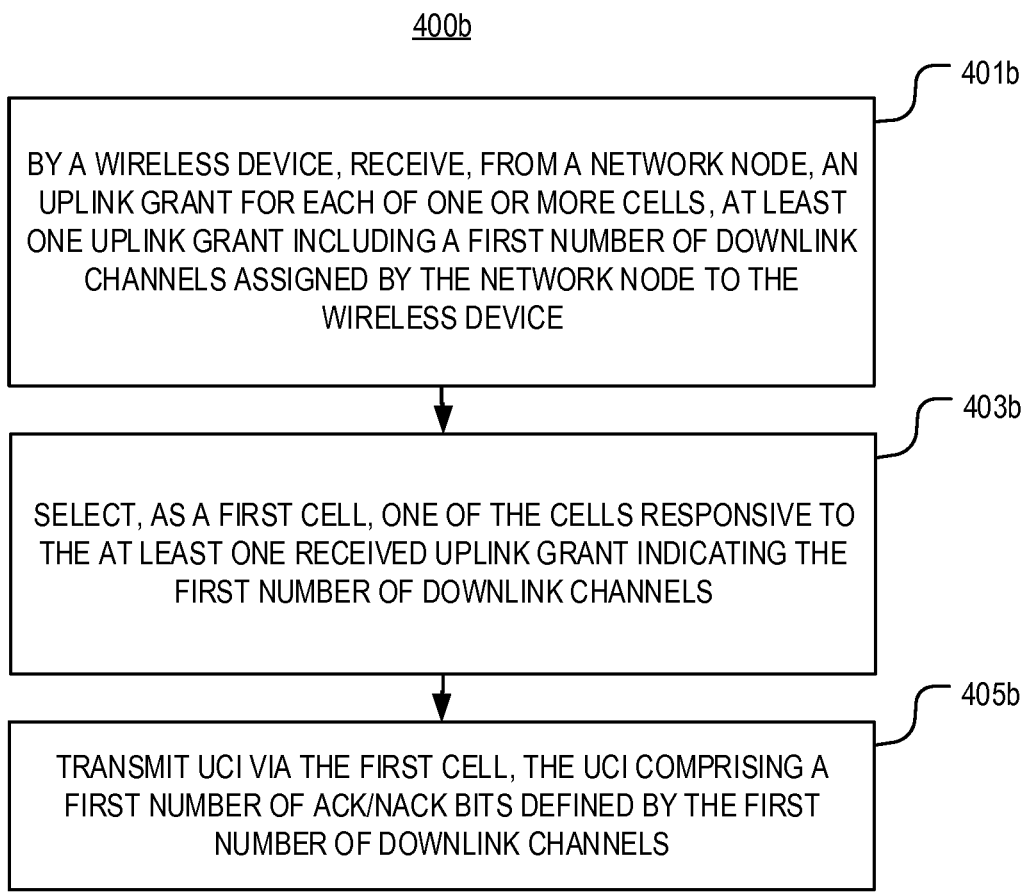

In FIG. 4B, the method 400b may start, for example, at block 401b where it includes receiving, from a network node, an uplink grant for each for one or more cells, where at least one of the received uplink grants indicates a first number of downlink assignments by the network node to the wireless device. At block 403b, the method 400b includes selecting, as a first cell, one of the one or more cells responsive to the at least one received uplink grant indicating the first number of downlink assignments. Further, at block 405b, the method 400b includes transmitting uplink control information via the first cell, where the uplink control information comprises a first number of ACK/NACK bits defined by the first number of downlink assignments.

Figure 4C:
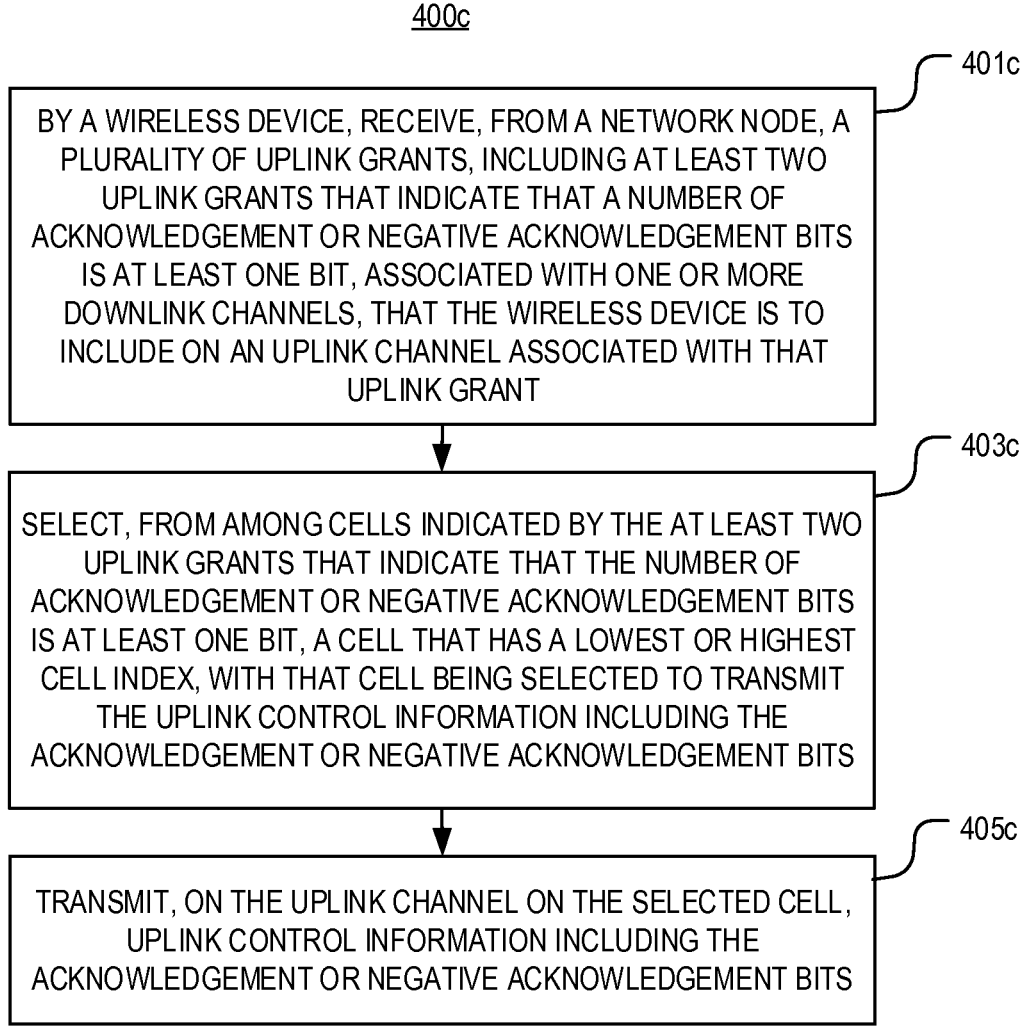

In FIG. 4C, the method 400c may start, for example, at block 401c where it includes receiving, from a network node, a plurality of uplink grants, including at least two uplink grants that indicate that a number of acknowledgement or negative acknowledgement bits is at least one bit, associated with one or more downlink assignments, that the wireless device is to include on an uplink channel associated with that uplink grant. At block 403c, the method 400c includes selecting, from among cells indicated by those at least two uplink grants, a cell that has a lowest or highest cell index, with that cell being selected to transmit the uplink control information having the acknowledgement or negative acknowledgement bits. Further, the method 400c includes transmitting, on the uplink channel on the selected cell, uplink control information having the acknowledgement or negative acknowledgement bits, as represented by block 405c.

Figure 4D:
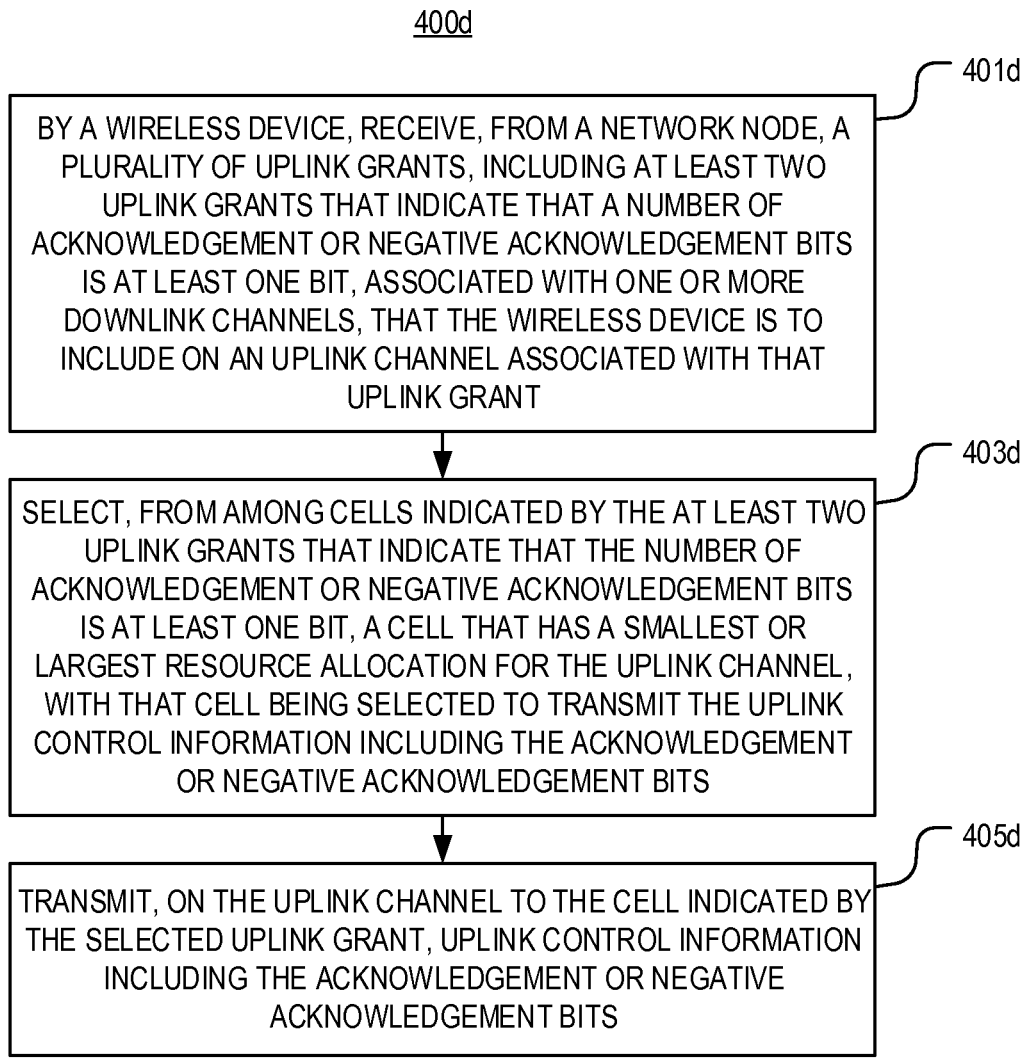

In FIG. 4D, the method 400d may start, for example, at block 401d where it includes receiving, from a network node, a plurality of uplink grants, including at least two uplink grants that indicate that a number of acknowledgement or negative acknowledgement bits is at least one bit, associated with one or more downlink assignments, that the wireless device is to include on an uplink channel associated with that uplink grant. At block 403d, the method 400d includes selecting, from among cells indicated by those at least two uplink grants, a cell that has a smallest or largest resource allocation for the uplink channel, with that cell being selected to transmit the uplink control information having the acknowledgement or negative acknowledgement bits. Further, the method 400d includes transmitting, on the uplink channel to the selected cell, uplink control information having the acknowledgement or negative acknowledgement bits, as represented by block 405d.

Figure 4E:
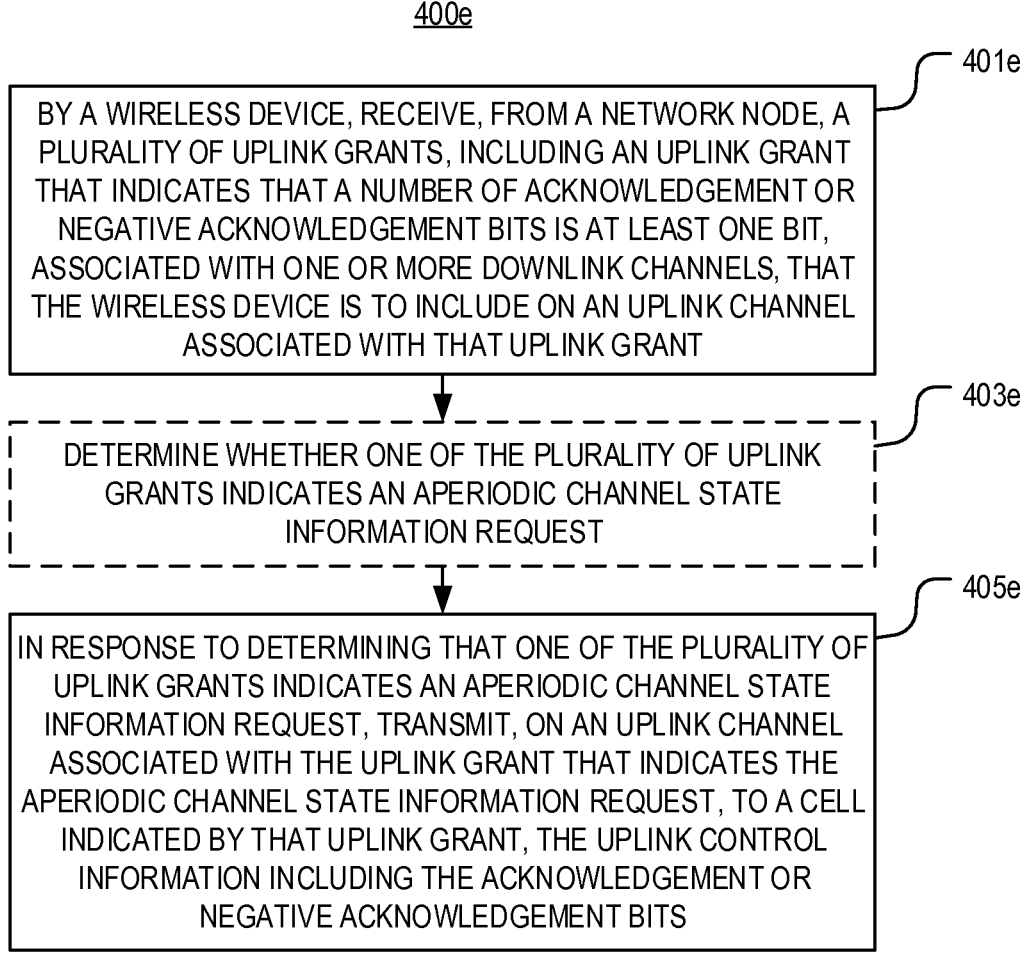

In FIG. 4E, the method 400e may start, for example, at block 401e where it includes receiving, from a network node, a plurality of uplink grants, including an uplink grant that indicates that a number of acknowledgement or negative acknowledgement bits is at least one bit, associated with one or more downlink assignments, that the wireless device is to include on an uplink channel associated with that uplink grant. At block 403e, the method 400e may include determining whether one of the plurality of uplink grants indicates an aperiodic channel state information request. In response to determining that one of the plurality of uplink grants indicates an aperiodic channel state information request, the method 400e includes transmitting, on an uplink channel associated with the uplink grant that indicates the aperiodic channel state information request, on a cell indicated by that uplink grant, the uplink control information having the acknowledgement or negative acknowledgement bits, as represented by block 405e.

Figure 4F:
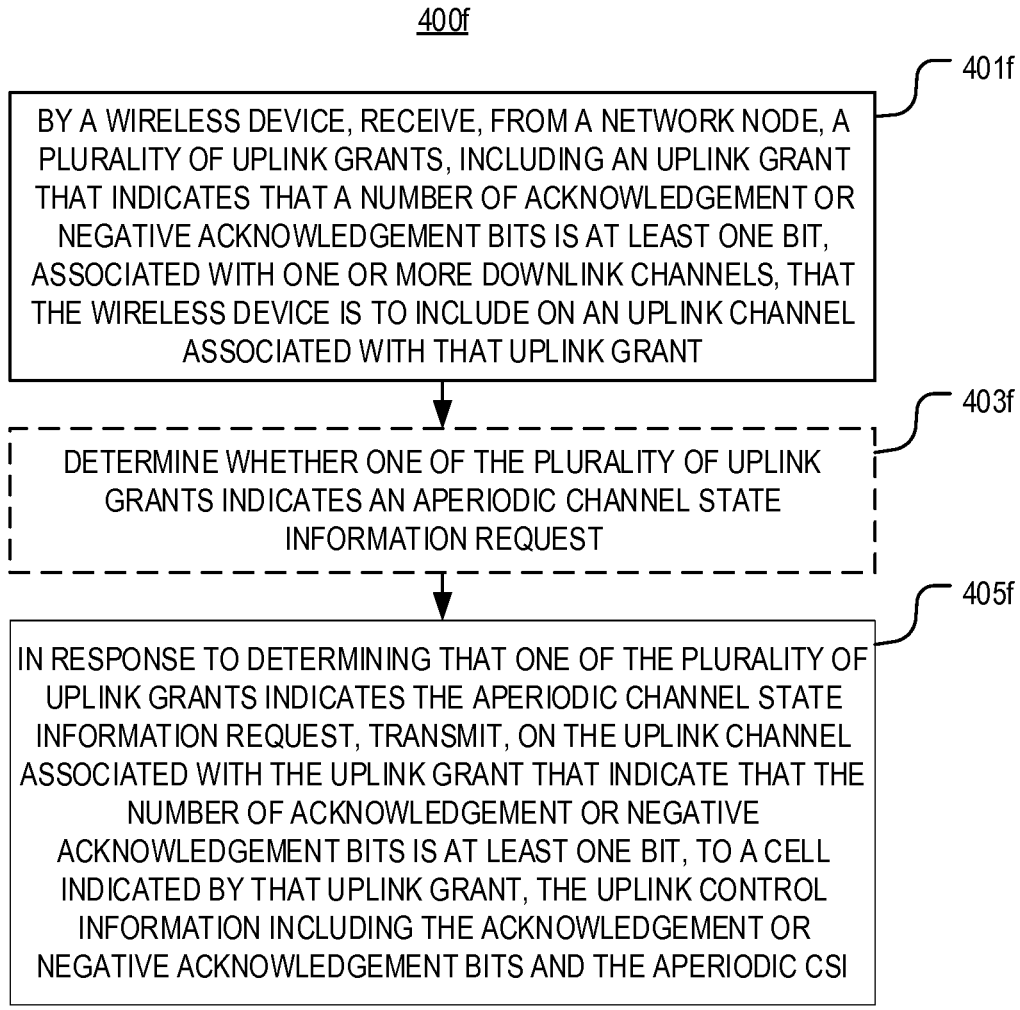

In FIG. 4F, the method 400f may start, for example, at block 401f where it includes receiving, from a network node, a plurality of uplink grants, including an uplink grant that indicates that a number of acknowledgement or negative acknowledgement bits is at least one bit, associated with one or more downlink assignments, that the wireless device is to include on an uplink channel associated with that uplink grant. At block 403f, the method 400f may include determining whether one of the plurality of uplink grants indicates an aperiodic channel state information request. In response to determining that one of the plurality of uplink grants indicates an aperiodic channel state information request, the method 400f includes transmitting, on the uplink channel associated with the uplink grant that indicates that the number of acknowledgement or negative acknowledgement bits is at least one, via the cell indicated by that uplink grant, the uplink control information having the acknowledgement or negative acknowledgement bits and the aperiodic channel state information, as represented by block 407f.

Figure 4G:
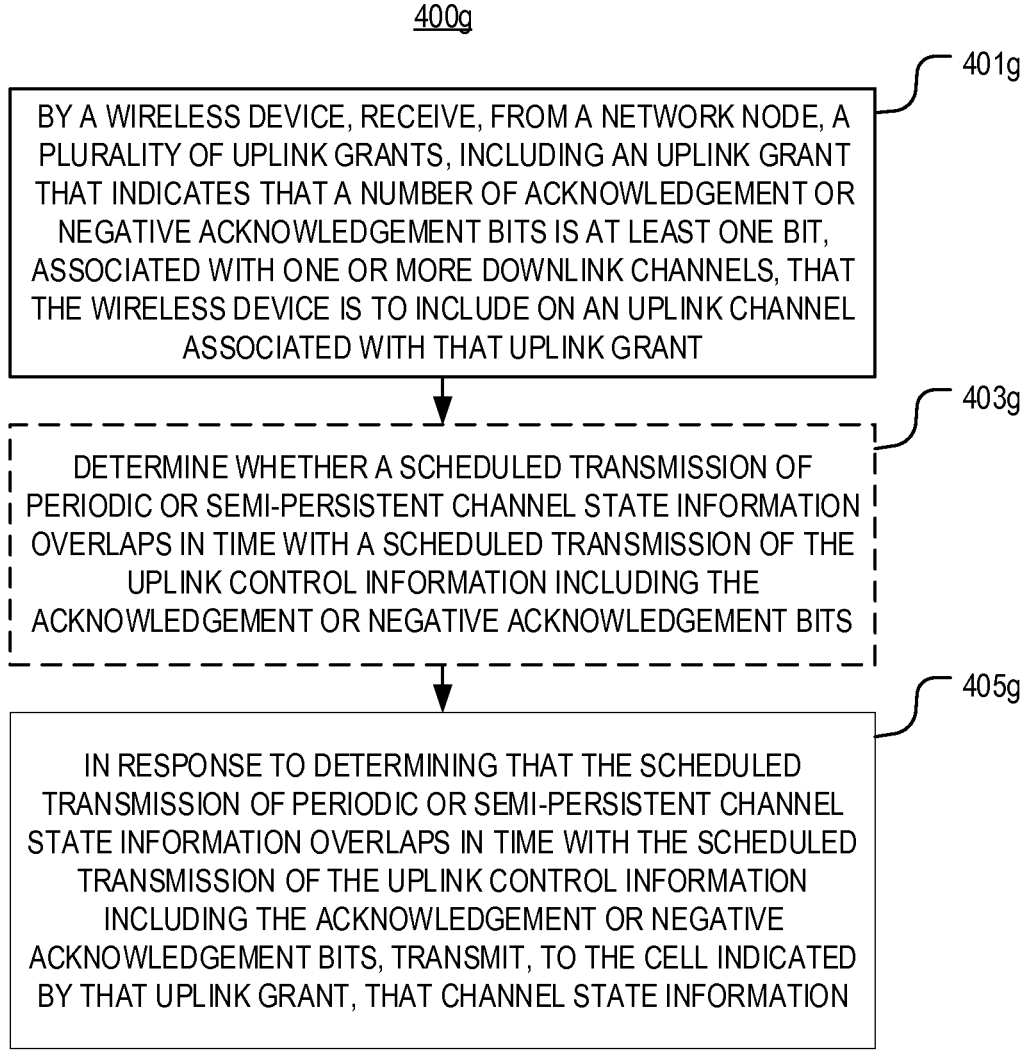

In FIG. 4G, the method 400g may start, for example, at block 401g where it includes receiving, from a network node, a plurality of uplink grants, including an uplink grant that indicates that a number of acknowledgement or negative acknowledgement bits is at least one bit, associated with one or more downlink assignments, that the wireless device is to include on an uplink channel associated with that uplink grant. At block 403g, the method 400g may include determining whether a scheduled transmission of periodic or semi-persistent channel state information overlaps in time with a schedule transmission of the uplink control information having the acknowledgement or negative acknowledgement bits. In one example, the scheduled transmission of the periodic or semi-persistent channel state information overlaps in a same transmission time interval or slot with the scheduled transmission of the uplink control information having the acknowledgement or negative acknowledgement bits. In response to determining that the scheduled transmission of the periodic or semi-persistent channel state information overlaps in time with the scheduled transmission of the uplink control information having the acknowledgement or negative acknowledgement bits, the method 400g includes transmitting, to the cell indicated by that uplink grant, that channel state information, as represented by block 407g.

Figure 4H:
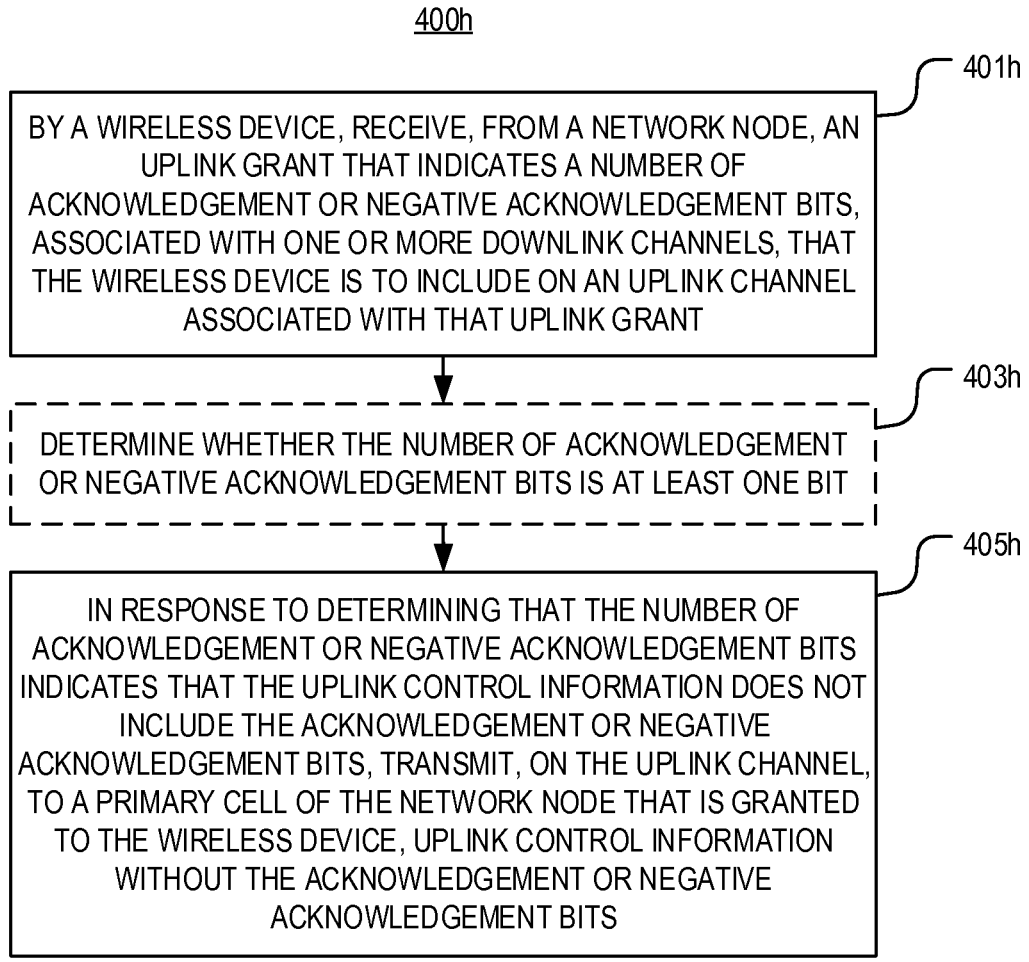

In FIG. 4H, the method 400h may start, for example, at block 401h where it includes receiving, from a network node, an uplink grant that indicates a number of acknowledgement or negative acknowledgement bits, associated with one or more downlink assignments, that the wireless device is to include on an uplink channel associated with that uplink grant. At block 403h, the method 400h may include determining whether the number of acknowledgement or negative acknowledgement bits is at least one bit. In response to determining that the number of acknowledgement or negative acknowledgement bits indicates that the uplink control information does not include the acknowledgement or negative acknowledgement bits, the method 400h includes transmitting, on the uplink channel, to a primary cell of the wireless device that is granted to the wireless device, uplink control information without the acknowledgement or negative acknowledgement bits, as represented by block 405h.

Figure 4I:
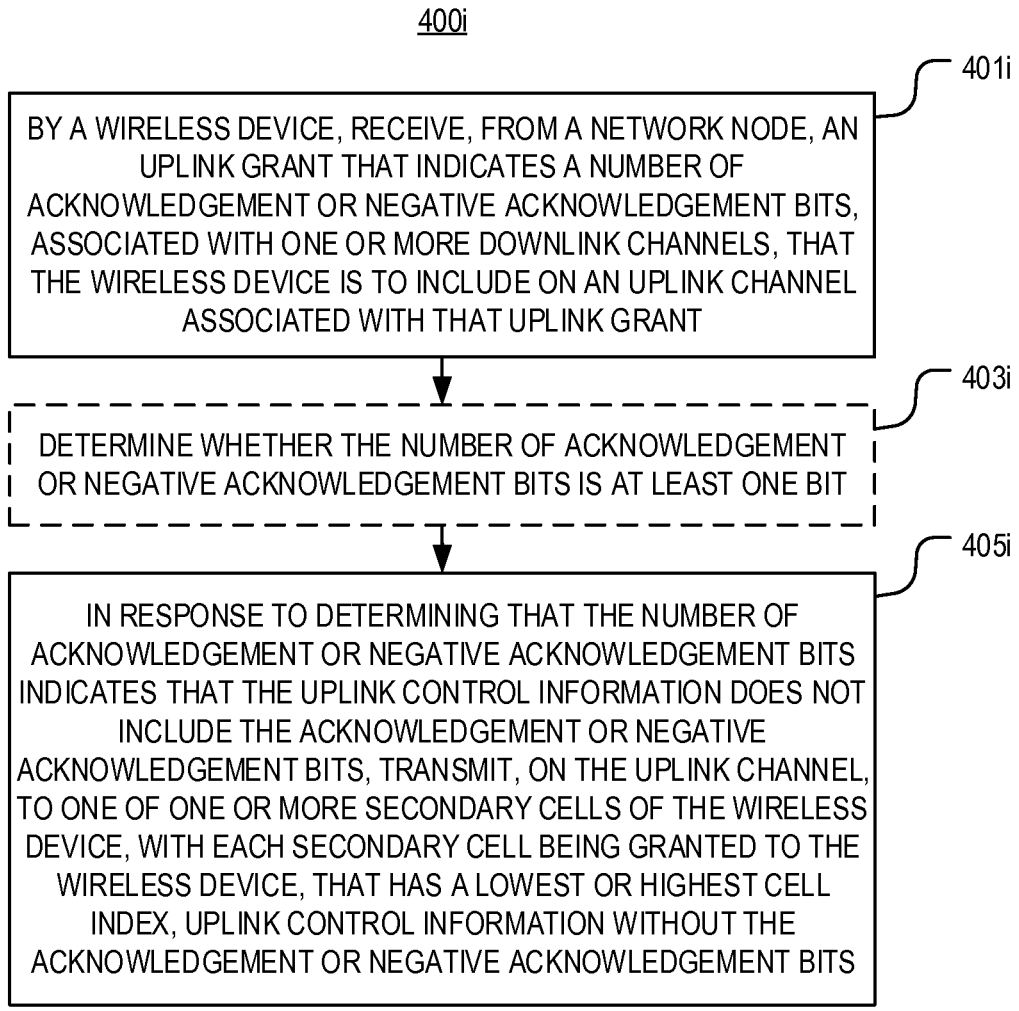

In FIG. 4I, the method 400i may start, for example, at block 401i where it includes receiving, from a network node, an uplink grant that indicates a number of acknowledgement or negative acknowledgement bits, associated with one or more downlink assignments, that the wireless device is to include on an uplink channel associated with that uplink grant. At block 403i, the method 400i may include determining whether the number of acknowledgement or negative acknowledgement bits is at least one bit. In response to determining that the number of acknowledgement or negative acknowledgement bits indicates that the uplink control information does not include the acknowledgement or negative acknowledgement bits, the method 400i includes transmitting, on the uplink channel, to one of one or more secondary cells of the wireless device, with each secondary cell being granted to the wireless device, that has a lowest or highest cell index, uplink control information without the acknowledgement or negative acknowledgement bits, as represented by block 405i.

Figure 4J:
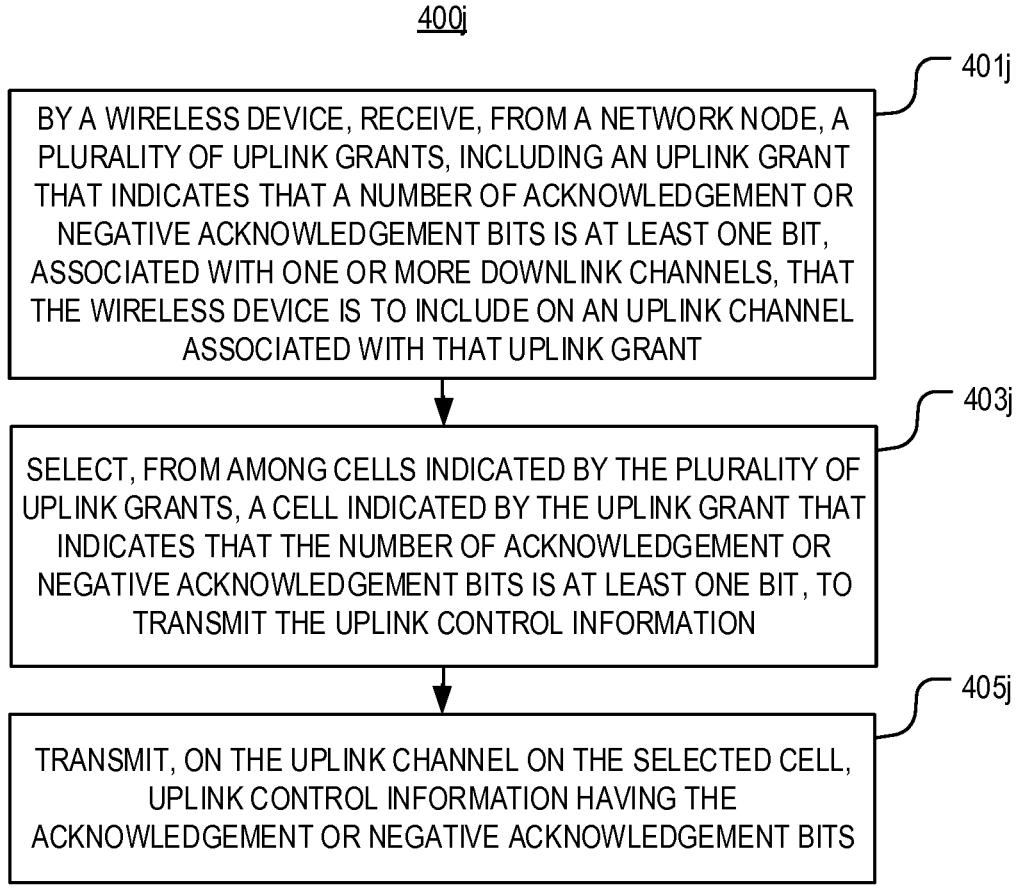

In FIG. 4J, the method 400j may start, for instance, at block 401j where it includes receiving, from a network node, a plurality of uplink grants, including an uplink grant that indicates that a number of acknowledgement or negative acknowledgement bits is at least one bit, associated with one or more downlink channels, that the wireless device is to include on an uplink channel associated with that uplink grant. At block 403j, the method 400j includes selecting, from among cells indicated by the plurality of uplink grants, a cell indicated by the uplink grant that indicates that the number of acknowledgement or negative acknowledgement bits is at least one bit, to transmit the uplink control information. Further, the method 400j transmits, on the uplink channel to the cell indicated by the selected uplink grant, uplink control information having the acknowledgement or negative acknowledgement bits, as represented by block 405j.

Figure 5:
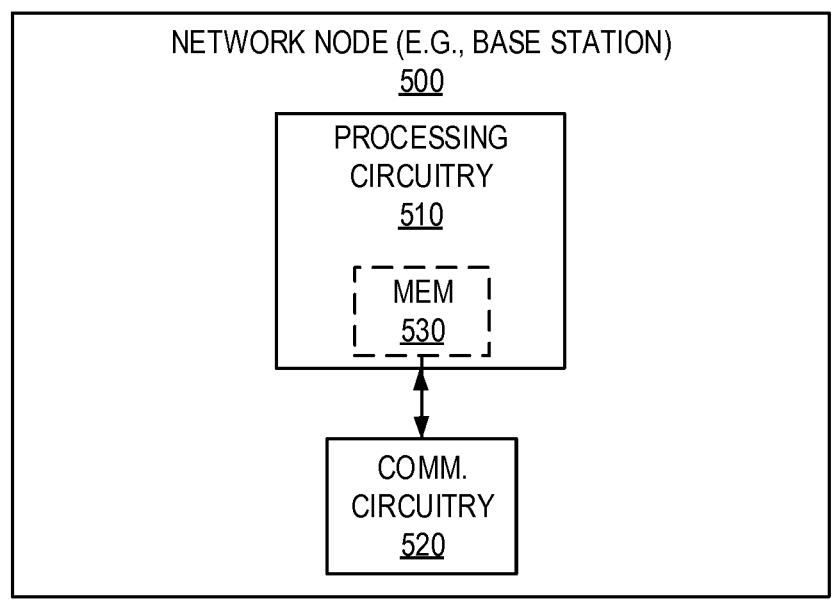
FIG. 5 shows a block diagram of a network node according to one exemplary embodiment.

FIG. 5 illustrates a network node 500 as implemented in accordance with various embodiments described herein. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, such as by executing instructions stored in memory 530. The processing circuitry 510 in this regard may implement certain functional means, units, circuits, or modules.

Figure 6:
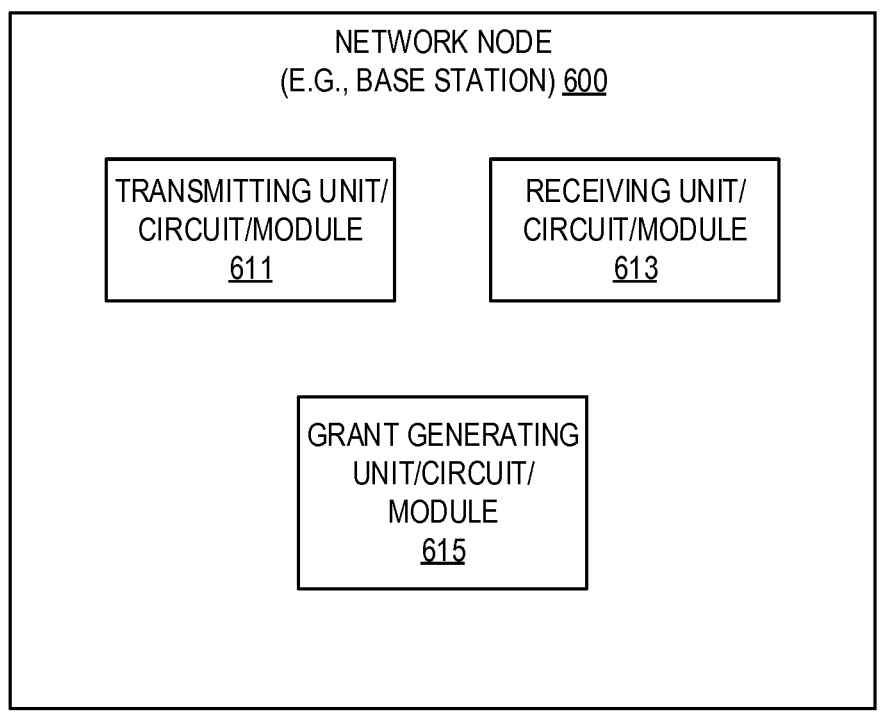
FIG. 6 shows a block diagram of a network node according to another exemplary embodiment.

FIG. 6 illustrates a schematic block diagram of one exemplary embodiment of a network node 600 in a wireless network in accordance various embodiments described herein (for example, the network node shown in FIGS. 1A, 1B, and 8). As shown, network node 600 implements various functional means, units, circuits, or modules, e.g., via the processing circuitry 510 in FIG. 5 and/or via software code. In one exemplary embodiment, these functional means, units, circuits, or modules, e.g., for implementing the method(s) herein, may include: a transmitting unit/circuit/module 611, a receiving unit/circuit/module 613, and a grant generating unit/circuit/module 615. The grant generating unit/circuit/module 615 is configured to generate an UL grant for each of one or more cells, where at least one of the generated UL grants indicates a first number of DL assignments by the network node to the wireless device to indicate to the wireless device a first number of ACK/NACK bits to be transmitted to the network node. The transmitting unit/circuit/module 611 is configured to transmit each of the generated UL grants to a wireless device. The receiving unit/circuit/module 615 is configured to receive UL control information via a first cell selected by the wireless device responsive to the transmitted UL grants, where the first cell comprises one of the cells selected responsive to the at least one generated UL grants indicating the first number of downlink assignments, and where the UL control information comprises the first number of ACK/NACK bits.

Figure 7A:
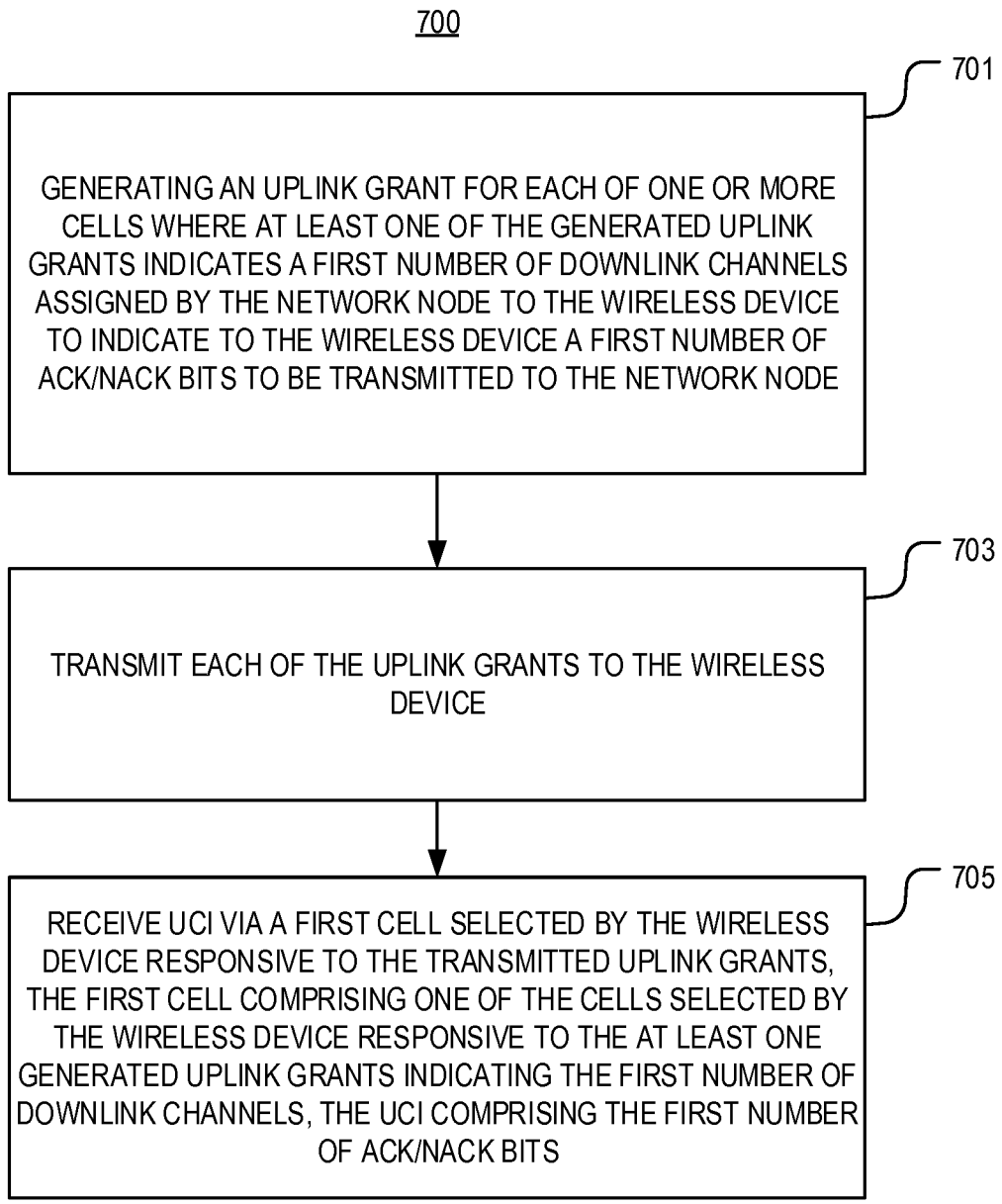
FIGS. 7A-7B show exemplary methods performed by a network node according to an exemplary embodiment.

FIG. 7A illustrates one exemplary method 700 performed by a network node for selecting a cell for transmission of uplink control information by a wireless device in accordance with various embodiments described herein. In FIG. 7A, the method 700 may start, for example, at block 701 where the network node generates an UL grant for each of one or more cells, where at least one of the generated UL grants indicates a first number of DL assignments by the network node to the wireless device to indicate to the wireless device a first number of ACK/NACK bits to be transmitted to the network node. The network node, at block 703, transmits each of the UL grants to the wireless device. Further, the network node, at block 705 receives UL control information via a first cell selected by the wireless device responsive to the transmitted UL grants, where the first cell comprises one of the cells selected responsive to the at least one generated UL grants indicating the first number of downlink assignments, and where the UL control information comprises the first number of ACK/NACK bits.

Figure 7B:
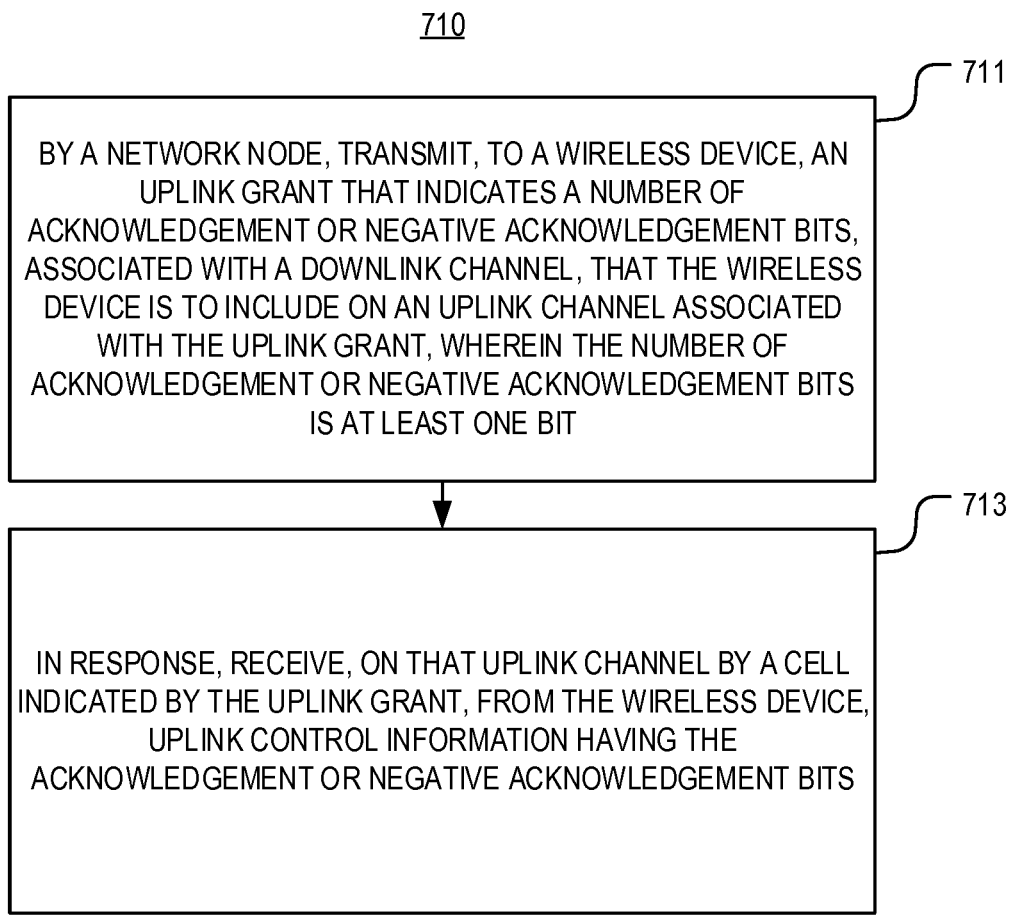

FIG. 7B illustrates one embodiment of a method 710 performed by a network node for selecting a cell for transmitting control information in accordance with various embodiments described herein. In FIG. 7B, the method 710 may start, for instance, at block 711 where it includes transmitting, to a wireless device, an uplink grant that indicates that a number of acknowledgement or negative acknowledgement bits is at least one bit, associated with one or more downlink channels, that the wireless device is to include on an uplink channel associated with the uplink grant. In response, the method 710 includes receiving, on that uplink channel on a cell indicated by that uplink grant, from the wireless device, uplink control information having the acknowledgement or negative acknowledgement bits, as represented by block 713.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

If a UE has multiple UL grants and needs to report the UCI on the PUSCH, the UE selects the UL cell for which the UL grant (e.g., with UL DAI greater than or equal to 1) indicates that UE should include ACK/NACK bits. If the UE transmits at the same time periodic or semi-persistent CSI (which should have been transmitted on the same PUCCH as ACK/NACK), the CSI may also be transmitted via the same UL cell.

If one of the UL grants has the aperiodic CSI request field set, three possible behaviors can be distinguished:
  Grant with aperiodic CSI request field set overrides the PUSCH grant with UL DAI greater than or equal to 1, i.e., ACK/NACK and CSI is reported via the UL cell indicated by the UL grant with aperiodic CSI request field set.
  Grant with UL DAI greater than or equal to 1 overrides the UL grant with aperiodic CSI request field set, i.e., ACK/NACK and CSI are reported via the UL cell indicated by the UL grant with UL DAI greater than or equal to 1.
  ACK/NACK is transmitted via the UL cell indicated by the UL grant with UL DAI greater than or equal to 1 and aperiodic CSI is transmitted via the UL cell with aperiodic CSI request field set.

The case that multiple UL grants indicate UL DAI greater than or equal to 1 (with the meaning UL DAI greater than or equal to 1) is either an error case (bad NW implementation to schedule UL grants like that) or allowed, in the latter case the UE behavior would have to de defined. One possibility is to use the UL carrier with lowest/highest carrier index among those carriers which grant indicate UL DAI greater than or equal to 1. The other case would be to UL carrier which has the largest PUSCH allocations among those carriers which grant indicate UL DAI greater than or equal to 1 (smallest PUSCH is another, less preferred choice).

If the behavior for an UL grant with DAI=4 can also mean 0 is agreed, then if a UE has multiple UL grants and all of them indicate DAI=4, the UE does not know from the UL grants including the DAI alone if one of the UL grants actually mean 4 and all other 0 or if all mean 0. As it is unlikely that a UE has missed 4 (or 4+n*4) DL assignments, it is very likely that UE knows if one DAI means 4 while the other ones mean 0. Nevertheless, the UE does not know which UL DAI means 4. Therefore, the above rule cannot be applied if the UL DAI should indicate 4 (with the meaning 4 or 4+n*4). In case all UL DAI indicate 4, the UE uses another rule to determine the UL cell that should be used to transmit UCI. One example would be to the use the LTE rule based on PCell/SCell index instead.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points) and base stations (BSs) (e.g., radio base stations, Node Bs, evolved Node Bs (eNBs), and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892; instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprises one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated. User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
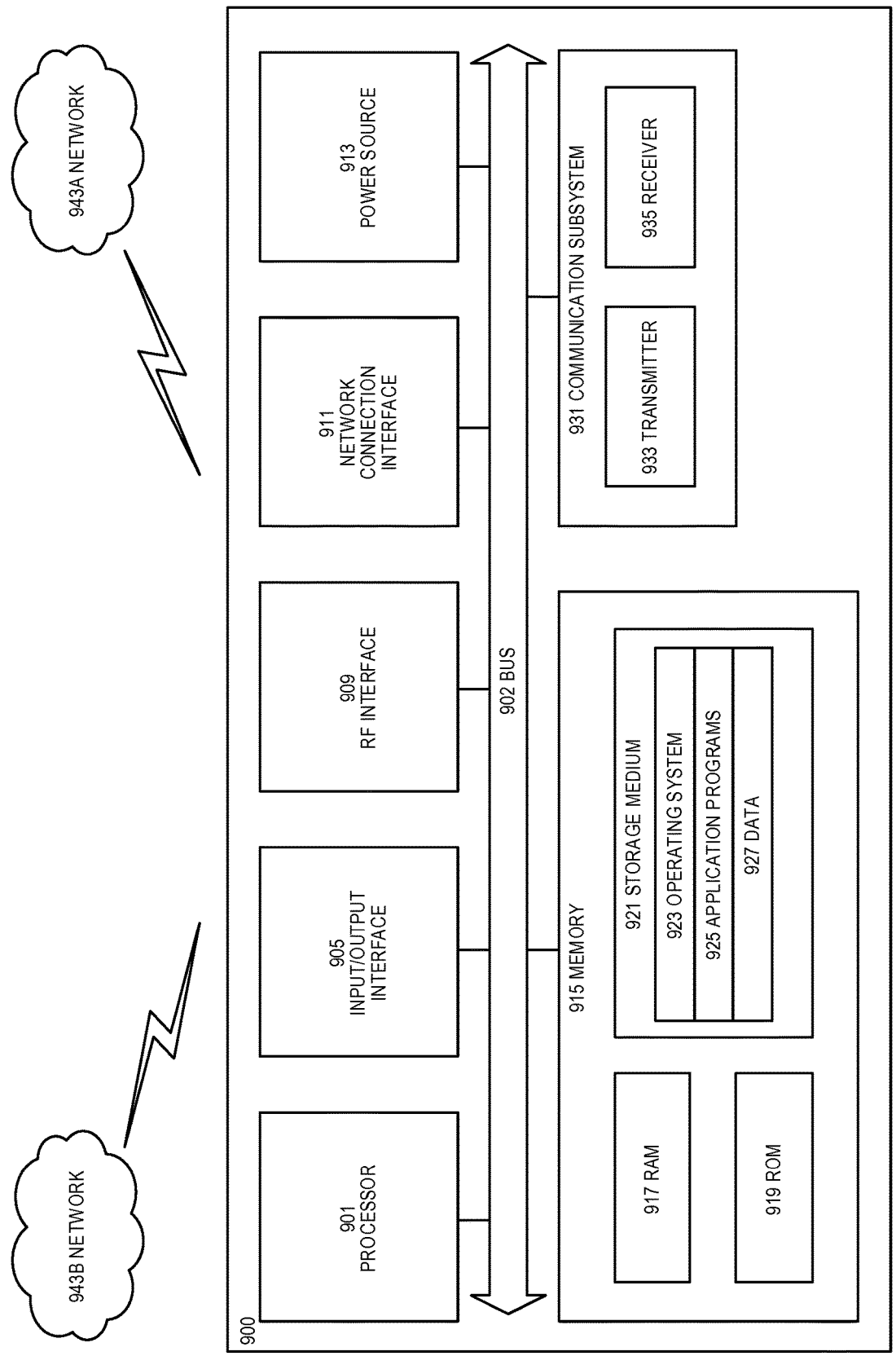
FIG. 9 shows an exemplary UE applicable to the solution presented herein.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 920 may be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943*a*. Network 943*a* may encompass wired and/or wireless networks such as a local-area network (LAN), a wide-area network (WAN), a computer network, a wireless network, a telecommunications network, another like network or any combination thereof. For example, network 943*a* may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943*b* using communication subsystem 931. Network 943*a* and network 943*b* may be the same network or networks or different network or networks. Communication subsystem 931 may be configured to include one or more transceivers used to communicate with network 943*b*. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943*b* may encompass wired and/or wireless networks such as a local-area network (LAN), a wide-area network (WAN), a computer network, a wireless network, a telecommunications network, another like network or any combination thereof. For example, network 943*b* may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
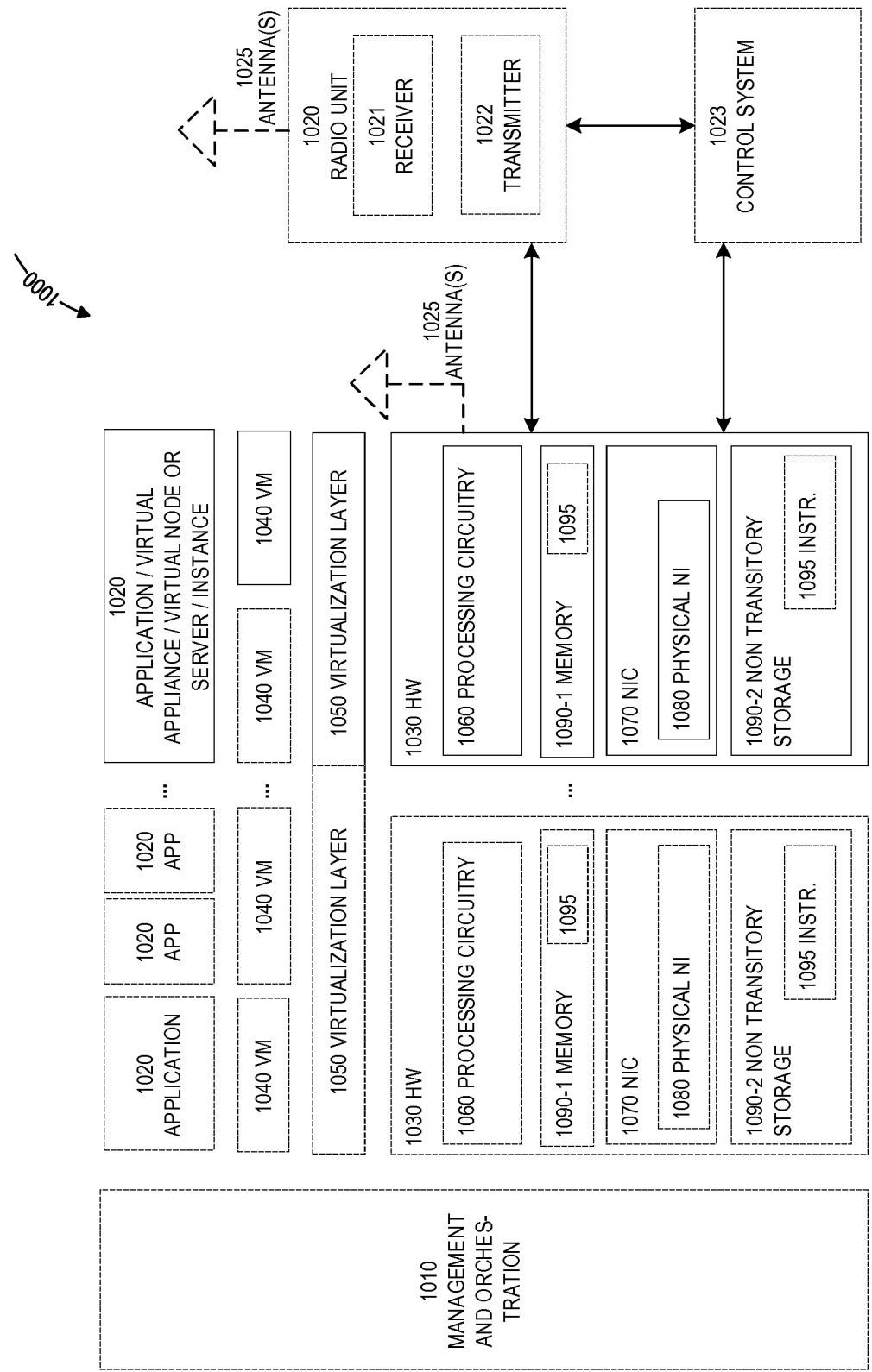
FIG. 10 shows an exemplary virtualization environment applicable to the solution presented herein.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 1010, which, among others, oversees lifecycle management of applications 1020. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 1020 that each include one or more transmitters 1022 and one or more receivers 1021 may be coupled to one or more antennas 1025. Radio units 1020 may communicate directly with hardware nodes 1030 via one or more appropriate network interfaces and may be used in combination with the virtual components to provide a virtual node with radio capabilities, such as a radio access node or a base station. In some embodiments, some signalling can be effected with the use of control system 1023 which may alternatively be used for communication between the hardware nodes 1030 and radio units 1020.

Figure 11:
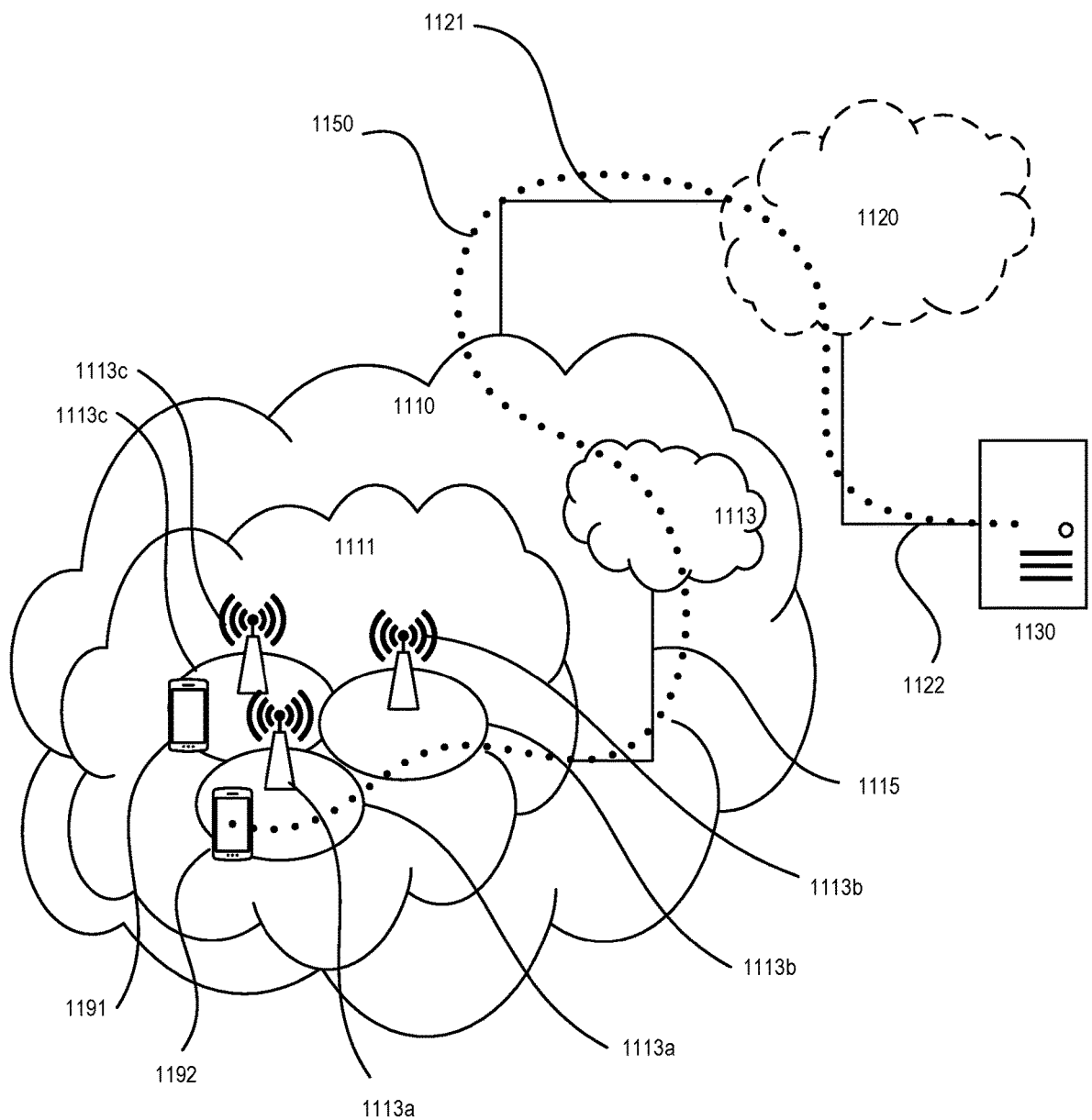
FIG. 11 shows an exemplary telecommunications network applicable to the solution presented herein.

FIG. 11 illustrates a telecommunication network connected via an intermediate network to a host computer in accordance with some embodiments. In particular, with reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server, or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Figure 12:
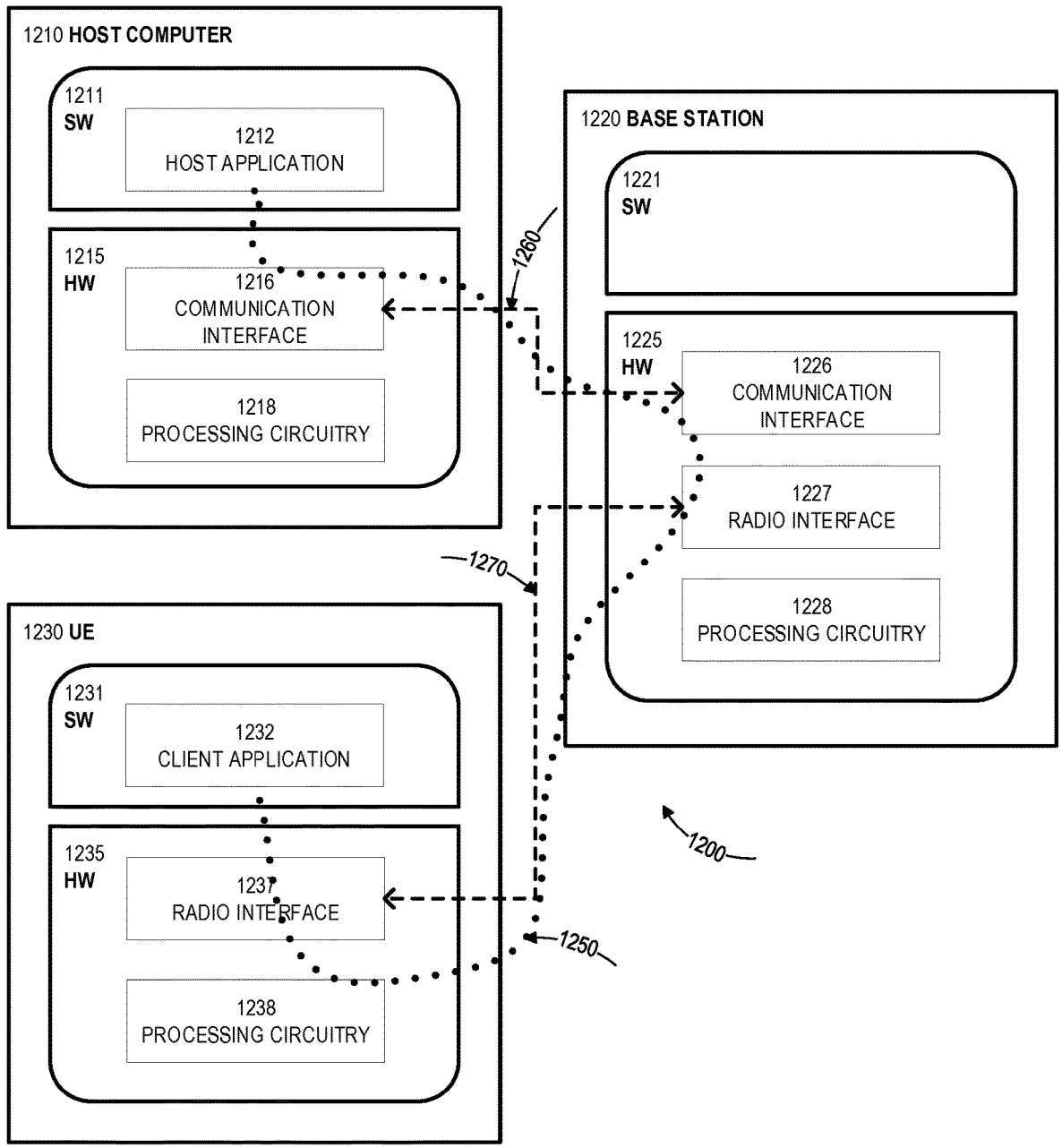
FIG. 12 shows an exemplary host computer applicable to the solution presented herein.

Example implementations, in accordance with an embodiment, of the UE, base station and host computer discussed in the preceding paragraphs will now be described with reference to FIG. 12. FIG. 12 illustrates host computer communicating via a base station with a user equipment over a partially wireless connection in accordance with some embodiments In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1230, one of base stations 1212a, 1212b, 1212c and one of UEs 1291, 1292 of FIG. 12, respectively. This is to say, the inner workings of these entities may be as shown in FIG. 12 and independently, the surrounding network topology may be that of FIG. 12.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or by supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
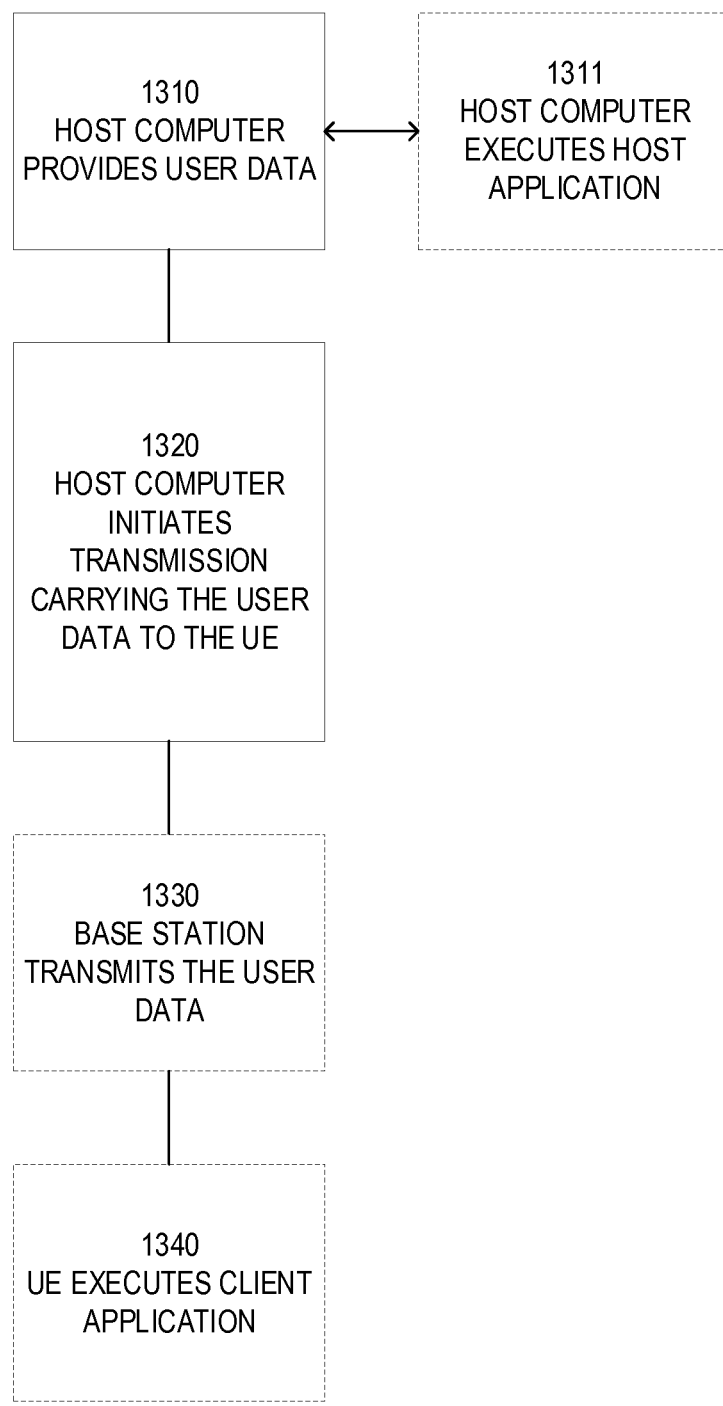
FIG. 13 shows an exemplary method implemented in a communication system in accordance with embodiments of the solution presented herein.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
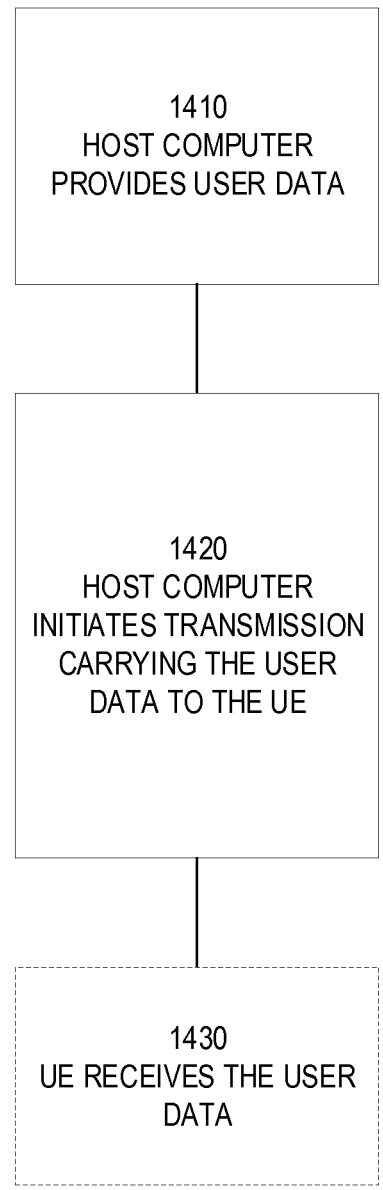
FIG. 14 shows another exemplary method implemented in a communication system in accordance with embodiments of the solution presented herein.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
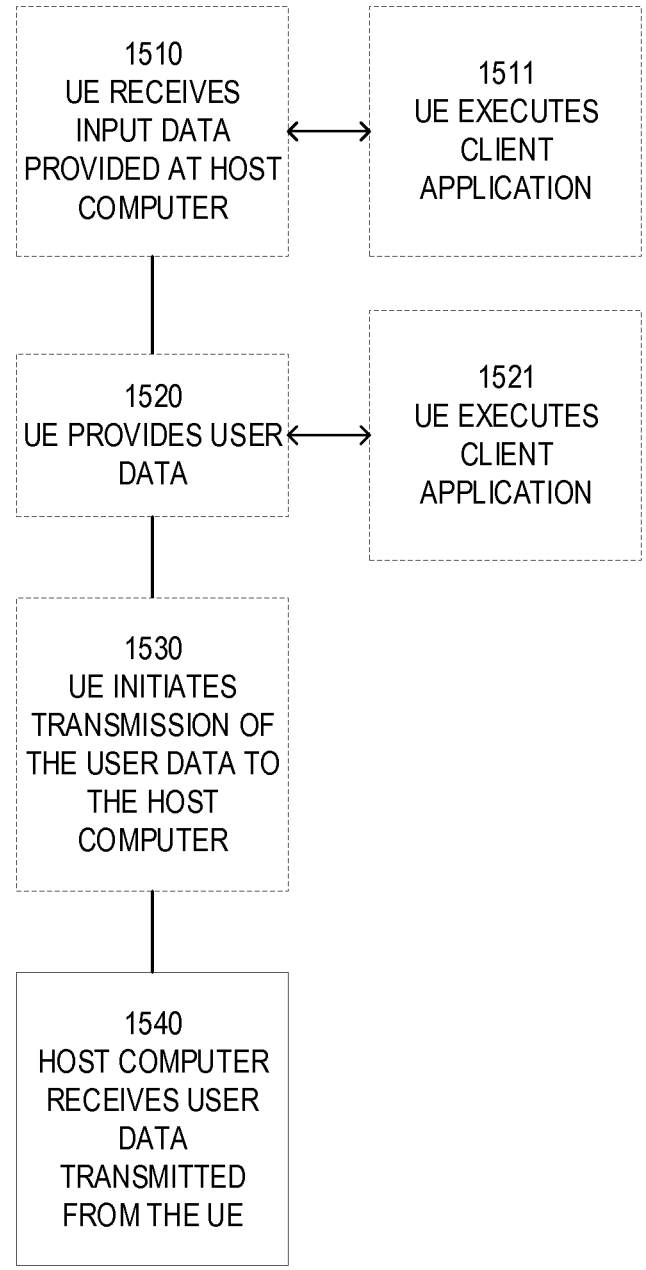
FIG. 15 shows another exemplary method implemented in a communication system in accordance with embodiments of the solution presented herein.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
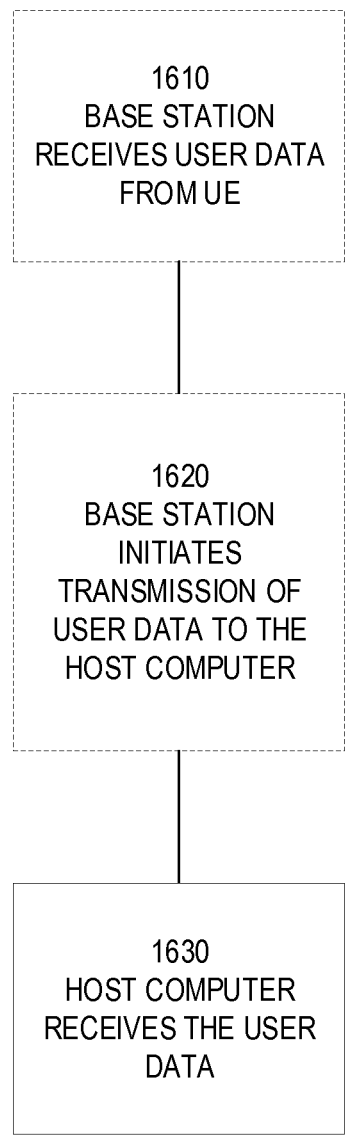
FIG. 16 shows another exemplary method implemented in a communication system in accordance with embodiments of the solution presented herein.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following presents various embodiments for the solution presented herein.

Group A Embodiments

1. A method performed by a wireless device, comprising receiving, by the wireless device, from a network node, an uplink grant that indicates a number of acknowledgement or negative acknowledgement bits, associated with one or more downlink assignments, that the wireless device is to include on an uplink channel associated with that uplink grant; and in response to determining that the number of acknowledgement or negative acknowledgement bits is at least one bit, transmitting, on the uplink channel by the wireless device, on a cell indicated by that uplink grant, uplink control information having the acknowledgement or negative acknowledgement bits.

2. The method of embodiment 1, wherein said receiving includes receiving, by the wireless device, from the network node, a plurality of uplink grants, including the uplink grant that indicates that the number of acknowledgement or negative acknowledgement bits is at least one bit; and selecting, from among cells indicated by the plurality of uplink grants, the cell indicated by the uplink grant that indicates that the number of acknowledgement or negative acknowledgement bits is at least one bit, to transmit the uplink control information having the acknowledgement or negative acknowledgement bits.

3. The method of embodiment 2, wherein said receiving includes receiving, by the wireless device, from the network node, a plurality of uplink grants, including at least two uplink grants that indicate that the number of acknowledgement or negative acknowledgement bits is at least one bit; and wherein said selecting includes selecting, from among cells indicated by those at least two uplink grants, a cell that has a lowest or highest cell index, to transmit the uplink control information having the acknowledgement or negative acknowledgement bits.

4. The method of any of embodiments 2-3, wherein said receiving includes receiving, by the wireless device, from the network node, a plurality of uplink grants, including at least two uplink grants that indicate that the number of acknowledgement or negative acknowledgement bits is at least one bit; and wherein said selecting includes selecting, from among cells indicated by those at least two uplink grants, a cell that has a smallest or largest resource allocation for the uplink channel, to transmit the uplink control information having the acknowledgement or negative acknowledgement bits.

5. The method of any of embodiments 2-4, wherein said selecting includes, in response to determining that one of the plurality of uplink grants indicates an aperiodic channel state information request, selecting a cell indicated by the uplink grant, that indicates an aperiodic channel state information request, to transmit the uplink control information having the acknowledgement or negative acknowledgement bits or selecting the cell indicated by the uplink grant, that indicates that the number of acknowledgement or negative acknowledgement bits is at least one bit, to transmit the uplink control information having the acknowledgement or negative acknowledgement bits.

6A. The method of any of embodiments 1-5, wherein said transmitting includes, in response to determining that a scheduled transmission of periodic or semi-persistent channel state information overlaps in time with a scheduled transmission of the uplink control information having the acknowledgement or negative acknowledgement bits, transmitting, by the wireless device, on the cell indicated by the uplink grant that indicates that the number of acknowledgement or negative acknowledgement bits is at least one bit, that channel state information.

6B. The method of embodiment 6A, wherein the scheduled transmission of the periodic or semi-persistent channel state information overlaps in a same transmission time interval or slot with the scheduled transmission of the uplink control information having the acknowledgement or negative acknowledgement bits.

7. The method of any of embodiments 1-6B, wherein said selecting includes in response to determining that the number of acknowledgement or negative acknowledgement bits indicates that the uplink control information does not include the acknowledgement or negative acknowledgement bits, selecting a primary cell of the wireless device that is granted to the wireless device, to transmit uplink control information without the acknowledgement or negative acknowledgement bits.

8. The method of any of embodiments 1-7, wherein selecting includes in response to determining that the number of acknowledgement or negative acknowledgement bits indicates that the uplink control information does not include the acknowledgement or negative acknowledgement bits, selecting one of a plurality of secondary cells of the network node, with each secondary cell being granted to the wireless device, that has a lowest or highest cell index to transmit the uplink control information without the acknowledgement or negative acknowledgement bits.

9. The method of any of embodiments 1-8, wherein the uplink channel is a physical uplink shared channel.

10. The method of any of embodiments 1-9, wherein the uplink grant includes a downlink assignment indicator that indicates the number of acknowledgement or negative acknowledgement bits associated with the downlink channel.

11. The method of any of embodiments 1-10, wherein the uplink control information includes at least one of acknowledgement or negative acknowledgement bits; channel state information; scheduling request; and beam information.

12. The method of any of the previous embodiments, further comprising providing user data; and forwarding the user data to a host computer via the transmission to the base station.

Group B Embodiments

21. A method performed by a network node, comprising transmitting, by the network node, to a wireless device, an uplink grant that indicates that a number of acknowledgement or negative acknowledgement bits is at least one bit, associated with one or more downlink assignments, that the wireless device is to include on an uplink channel associated with the uplink grant; and in response, receiving, on that uplink channel on a cell indicated by the uplink grant, from the wireless device, uplink control information having the acknowledgement or negative acknowledgement bits.

22. The method of embodiment 21, wherein said transmitting includes transmitting, by the network node, to the wireless device, a plurality of uplink grants, including the uplink grant that indicates that the number of acknowledgement or negative acknowledgement bits is at least one bit; and wherein said receiving includes receiving, on the cell indicated by the uplink grant that indicates that the number of acknowledgment or negative acknowledgement bits is at least one bit, from the wireless device, the uplink control information having the acknowledgement or negative acknowledgement bits.

23. The method of any of embodiments 21-22, wherein said transmitting includes transmitting, by the network node, to the wireless device, a plurality of uplink grants, including at least two uplink grants that indicate that the number of acknowledgement or negative acknowledgement bits is at least one bit; and wherein said receiving includes receiving, on one of a plurality of cells indicated by those at least two uplink grants that has a lowest or highest cell index, from the wireless device, the uplink control information having the acknowledgement or negative acknowledgement bits.

24. The method of any of embodiments 21-23, wherein said transmitting includes transmitting, by the network node, to the wireless device, a plurality of uplink grants, including at least two uplink grants that indicate that the number of acknowledgement or negative acknowledgement bits is at least one bit; and wherein said receiving includes receiving, on one of a plurality of cells indicated by those at least two uplink grants that has a smallest or largest resource allocation for the uplink channel, from the wireless device, the uplink control information having the acknowledgement or negative acknowledgement bits.

25. The method of any of embodiments 21-24, wherein said receiving includes receiving, on an uplink channel associated with the uplink grant that indicates the aperiodic channel state information request on a cell indicated by that uplink grant, from the wireless device, uplink control information having the acknowledgement or negative acknowledgement bits; or receiving, on an uplink channel associated with the uplink grant that indicates that the number of acknowledgement or negative acknowledgement bits is at least one bit, on the cell indicated by that uplink grant, from the wireless device, uplink control information having the acknowledgement or negative acknowledgement bits.

26A. The method of any of embodiments 21-25, wherein said receiving includes receiving, on the cell indicated by the uplink grant that indicates that the number of acknowledgement or negative acknowledgement bits is at least one bit, from the wireless device, periodic or semi-persistent channel state information that overlaps in time with the uplink control information having the acknowledgement or negative acknowledgement bits.

26B. The method of embodiment 26A, wherein the periodic or semi-persistent channel state information overlaps in a same transmission time interval or slot with the uplink control information having the acknowledgement or negative acknowledgement bits.

27. The method of any of embodiments 21-26B, further comprising transmitting, by the network node, to the wireless device, an uplink grant that indicates that the uplink control information does not include the acknowledgement or negative acknowledgement bits; and receiving, on the uplink channel on a primary cell of the wireless device that is granted to the wireless device, from the wireless device, uplink control information without the acknowledgement or negative acknowledgement bits.

28. The method of any of embodiments 21-27, further comprising transmitting, by the network node, to the wireless device, an uplink grant that indicates that the uplink control information does not include the acknowledgement or negative acknowledgement bits; and receiving, on the uplink channel on one of a plurality of secondary cells of the network node, with each secondary cell being granted to the wireless device, that has a lowest or highest cell index, uplink control information without the acknowledgement or negative acknowledgement bits.

29. The method of any of embodiments 21-28, wherein the uplink control channel is a physical uplink shared channel.

30. The method of any of embodiments 21-29, wherein the uplink grant includes an uplink, downlink assignment indicator that indicates the number of acknowledgement or negative acknowledgement bits associated with the downlink channel.

31. The method of any of embodiments 21-30, wherein the uplink control information includes at least one of acknowledgement or negative acknowledgement bits; channel state information; scheduling request; and beam information.

32. The method of any of the previous Group B embodiments, further comprising obtaining user data; and forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments; and power supply circuitry configured to supply power to the wireless device.

C3. A wireless device comprising processing circuitry and memory, the memory containing instructions executable by the processing circuitry whereby the wireless device is configured to perform any of the steps of any of the Group A embodiments.

C4. A user equipment (UE) comprising an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

C5. A computer program comprising instructions which, when executed by at least one processor of a wireless device, causes the wireless device to carry out the steps of any of the Group A embodiments.

C6. A carrier containing the computer program of embodiment C5, wherein the carrier is one of an electronic signal, optical signal, radio signal, or computer readable storage medium.

C7. A base station configured to perform any of the steps of any of the Group B embodiments.

C8. A base station comprising processing circuitry configured to perform any of the steps of any of the Group B embodiments; power supply circuitry configured to supply power to the wireless device.

C9. A base station comprising processing circuitry and memory, the memory containing instructions executable by the processing circuitry whereby the base station is configured to perform any of the steps of any of the Group B embodiments.

C10. A computer program comprising instructions which, when executed by at least one processor of a base station, causes the base station to carry out the steps of any of the Group B embodiments.

C11. A carrier containing the computer program of embodiment C10, wherein the carrier is one of an electronic signal, optical signal, radio signal, or computer readable storage medium.

Group D Embodiments

D1. A communication system including a host computer comprising processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

D2. The communication system of the pervious embodiment further including the base station.

D3. The communication system of the previous 2 embodiments, further including the UE, wherein the UE is configured to communicate with the base station.

D4. The communication system of the previous 3 embodiments, wherein the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising at the host computer, providing user data; and at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising at the host computer, providing user data; and at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising communication interface configured to receive user data originating from a transmission from a user equipment (UE) to a base station, wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein the processing circuitry of the host computer is configured to execute a host application; and the UE's processing circuitry is configured to execute a client application associated with the host application, thereby providing the user data.

D18. The communication system of the previous 4 embodiments, wherein the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising at the UE, executing a client application, thereby providing the user data to be transmitted; and at the host computer, executing a host application associated with the client application.

D22. The method of the previous 3 embodiments, further comprising at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein the processing circuitry of the host computer is configured to execute a host application; the UE is configured to execute a client application associated with the host application, thereby providing the user data to be received by the host computer.

D27. A method implemented in a communication system including a host computer, a base station and a user equipment (UE), the method comprising at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a wireless device, of transmitting uplink control information, the method comprising:
receiving, from a network node, an uplink grant for each of a plurality of cells, wherein at least one of the received uplink grants indicates a first number of downlink assignments by the network node to the wireless device;
selecting a first cell from the plurality of cells responsive to the at least one of the received uplink grants indicating the first number of downlink assignments; and
transmitting uplink control information via the first cell, said uplink control information comprising a first number of acknowledgement/negative acknowledgement (ACK/NACK) bits defined by the first number of downlink assignments.

2. The method of claim 1, wherein the method further comprises determining that the first number of ACK/NACK bits defined by the first number of downlink assignments is zero responsive to two or more of the received uplink grants each indicating the first number of downlink assignments, the two or more of the received uplink grants comprising the uplink grant received for the first cell.

3. The method of claim 2, wherein said selecting comprises, in response to determining that the first number of ACK/NACK bits is zero, selecting a primary cell as said first cell.

4. The method of claim 2, wherein:
said selecting comprises, in response to determining that the first number of ACK/NACK bits is zero, selecting a secondary cell as said first cell; and
said secondary cell has a lowest or highest cell index of the cells.

5. The method of claim 1 wherein a first one of the received uplink grants indicates the first number of downlink assignments by the network node to the wireless device and a second one of the received uplink grants indicates a second number of downlink assignments by the network node to the wireless device, the method further comprising:
selecting, as a second cell, the cell associated with the second uplink grant, said second cell being different from said first cell; and
transmitting second uplink control information via the second cell, said second uplink control information comprising a second number of ACK/NACK bits defined by the second number of downlink assignments.

6. The method of claim 1, wherein:
one or more of the received uplink grants indicates a second number of downlink assignments by the network node to the wireless device; and
said selecting comprises selecting, from among the cells having uplink grants indicating the first or second number of downlink assignments, the cell having a lowest or highest cell index as the first cell.

7. The method of claim 1, wherein:
one or more of the received uplink grants indicates a second number of downlink assignments by the network node to the wireless device; and
said selecting comprises selecting, from among the cells having uplink grants indicating the first or second number of downlink assignments, the cell having a smallest or largest uplink channel resource allocation as the first cell.

8. The method of claim 1 wherein said selecting comprises selecting, as said first cell, one of the one or more cells associated with the at least one received uplink grant indicating the first number of downlink assignments.

9. A wireless device comprising:
processing circuitry configured to:
receive, from a network node, an uplink grant for each of a plurality of cells, wherein at least one of the received uplink grants indicates a first number of downlink assignments by the network node to the wireless device;

select a first cell from the plurality of cells responsive to the at least one of the received uplink grants indicating the first number of downlink assignments; and transmit uplink control information via the first cell, said uplink control information comprising a first number of acknowledgement/negative acknowledgement (ACK/NACK) bits defined by the first number of downlink assignments; and power supply circuitry configured to supply power to the wireless device.

10. A non-transitory computer-readable medium comprising a computer program product for controlling a wireless device, the computer program product comprising software instructions which, when run on at least one processing circuit in the wireless device, causes the wireless device to:

receive, from a network node, an uplink grant for each of a plurality of cells, wherein at least one of the received uplink grants indicates a first number of downlink assignments by the network node to the wireless device;

select a first cell from the plurality of cells responsive to the at least one of the received uplink grants indicating the first number of downlink assignments; and transmit uplink control information via the first cell, said uplink control information comprising a first number of acknowledgement/negative acknowledgement (ACK/NACK) bits defined by the first number of downlink assignments.

11. A method, performed by a network node in communication with a wireless device, of obtaining uplink control information, the method comprising:

generating an uplink grant for each of one or more cells, wherein at least one of the generated uplink grants indicates a first number of downlink assignments by the network node to the wireless device to indicate to the wireless device a first number of acknowledgement/negative acknowledgement (ACK/NACK) bits to be transmitted to the network node;

transmitting each of the generated uplink grants to the wireless device; and receiving uplink control information via a first cell selected by the wireless device responsive to the transmitted uplink grants, the first cell comprising one of the cells selected by the wireless device responsive to the at least one of the generated uplink grants indicating the first number of downlink assignments, said uplink control information comprising the first number of ACK/NACK bits.

12. The method of claim 11, wherein two or more of the generated uplink grants indicate the first number of downlink assignments by the network node to the wireless device to indicate to the wireless device that the first number of ACK/NACK bits is zero.

13. The method of claim 11, wherein one or more of the generated uplink grants indicate a second number of downlink assignments by the network node to the wireless device to indicate to the wireless device a second number of ACK/NACK bits to be transmitted by the wireless device to the network node via a second cell associated with one of the one or more uplink grants indicating the second number of downlink assignments, said second cell being different from said first cell.

14. The method of claim 11, wherein:

one or more of the generated uplink grants indicates a second number of downlink assignments by the network node to the wireless device; and said first cell comprises the cell, selected from among the cells having uplink grants indicating the first or second number of downlink assignments, having a lowest or highest cell index.

15. The method of claim 11, wherein:

one or more of the generated uplink grants indicates a second number of downlink assignments by the network node to the wireless device; and said first cell comprises the cell, selected from among the cells having uplink grants indicating the first or second number of downlink assignments, having a smallest or largest uplink channel resource allocation.

16. The method of claim 11 wherein said first cell comprises one of the one or more cells associated with the at least one of the generated uplink grants indicating the first number of ACK/NACK bits.

17. A network node comprising:

processing circuitry configured to:

generate an uplink grant for each of one or more cells, wherein at least one of the generated uplink grants indicates a first number of downlink assignments by the network node to a wireless device to indicate to the wireless device a first number of acknowledgement/negative acknowledgement (ACK/NACK) bits to be transmitted to the network node;

transmit each of the generated uplink grants to the wireless device; and receive uplink control information via a first cell selected by the wireless device responsive to the transmitted uplink grants, the first cell comprising one of the cells selected by the wireless device responsive to the at least one generated uplink grants indicating the first number of downlink assignments, said uplink control information comprising the first number of ACK/NACK bits; and power supply circuitry configured to supply power to the wireless device.

18. A non-transitory computer-readable medium comprising a computer program product for controlling a network node, the computer program product comprising software instructions which, when run on at least one processing circuit in the network node, causes the network node to:

generate an uplink grant for each of one or more cells, wherein at least one of the generated uplink grants indicates a first number of downlink assignments by the network node to a wireless device to indicate to the wireless device a first number of acknowledgement/negative acknowledgement (ACK/NACK) bits to be transmitted to the network node;

transmit each of the generated uplink grants to the wireless device; and receive uplink control information via a first cell selected by the wireless device responsive to the transmitted uplink grants, the first cell comprising one of the cells selected by the wireless device responsive to the at least one generated uplink grants indicating the first number of downlink assignments, said uplink control information comprising the first number of ACK/NACK bits.

19. A method, performed by a wireless device, of transmitting uplink control information, the method comprising:

receiving, from a network node, an uplink grant for each of one or more cells, wherein at least one of the received uplink grants indicates a first number of acknowledgement/non-acknowledgement (ACK/NACK) bits to be transmitted by the wireless device to the network node; and transmitting uplink control information via a first cell comprising one of the one or more cells associated with the at least one uplink grant indicating the first number of ACK/NACK bits, said uplink control information comprising the first number of ACK/NACK bits.

20. A method, performed by a network node in communication with a wireless device, of obtaining uplink control information, the method comprising:

generating an uplink grant for each of one or more cells, wherein at least one of the generated uplink grants indicates a first number of acknowledgement/negative acknowledgement (ACK/NACK) bits to be transmitted by the wireless device to the network node;

transmitting each of the generated uplink grants to the wireless device; and receiving uplink control information via a first cell comprising one of the cells associated with at least one of the generated uplink grants indicating the first number of ACK/NACK bits, said uplink control information comprising the first number of ACK/NACK bits.

* * * * *